United States Patent
Tezaur

(10) Patent No.: US 10,165,263 B2
(45) Date of Patent: Dec. 25, 2018

(54) POINT SPREAD FUNCTION ESTIMATION OF OPTICS BLUR

(71) Applicant: Nikon Corporation, Tokyo (JP)

(72) Inventor: Radka Tezaur, Belmont, CA (US)

(73) Assignee: NIKON CORPORATION (JP)

( * ) Notice: Subject to any disclaimer, the term of this patent is extended or adjusted under 35 U.S.C. 154(b) by 0 days.

(21) Appl. No.: 14/948,165

(22) Filed: Nov. 20, 2015

(65) Prior Publication Data

US 2016/0080737 A1  Mar. 17, 2016

Related U.S. Application Data

(63) Continuation-in-part of application No. PCT/US2014/049188, filed on Jul. 31, 2014.

(60) Provisional application No. 62/096,988, filed on Dec. 26, 2014, provisional application No. 62/083,703, filed on Nov. 24, 2014, provisional application No. 61/884,649, filed on Sep. 30, 2013.

(51) Int. Cl.
| | |
|---|---|
| *H04N 17/02* | (2006.01) |
| *H04N 17/00* | (2006.01) |
| *G06T 5/00* | (2006.01) |
| *G06T 7/80* | (2017.01) |

(52) U.S. Cl.
CPC .......... *H04N 17/002* (2013.01); *G06T 5/003* (2013.01); *G06T 7/80* (2017.01); *G06T 2207/30208* (2013.01)

(58) Field of Classification Search
CPC .... H04N 17/002; H04N 5/3572; H04N 5/357; G06T 7/80; G06T 5/003; G06T 2207/30208

USPC .................................................. 348/187, 188
See application file for complete search history.

(56) References Cited

U.S. PATENT DOCUMENTS

| | | | |
|---|---|---|---|
| 5,696,848 A | 12/1997 | Patti et al. | |
| 6,285,799 B1 * | 9/2001 | Dance ................. | H04N 17/002 382/260 |

(Continued)

FOREIGN PATENT DOCUMENTS

| | | |
|---|---|---|
| EP | 2085927 A1 | 10/2011 |
| WO | WO2006054192 A | 5/2006 |

(Continued)

OTHER PUBLICATIONS

Hansen, et al., "Deblurring Images: Matrices, Spectra, and Filtering", SIAM 2006.

(Continued)

*Primary Examiner* — Jefferey F Harold
*Assistant Examiner* — Humam M Satti
(74) *Attorney, Agent, or Firm* — Roeder & Broder LLP; Steven G. Roeder

(57) ABSTRACT

A method for estimating an optics point spread function (518) of a lens assembly (20) includes (i) providing a test chart (14); (ii) providing a capturing system (22); (iii) capturing a test chart image (316) of the test chart (14) with the capturing system (22) using the lens assembly (20) to focus light onto the capturing system (22); (iv) selecting an image area (490) from the test chart image (316); (v) dividing the image area (490) into a plurality of area blocks (494); and (vi) estimating an area point spread function (518) of the image area (490) using a PSF cost function that sums the fidelity terms of at least two of the area blocks (494).

22 Claims, 23 Drawing Sheets

(56) References Cited

U.S. PATENT DOCUMENTS

| | | | |
|---|---|---|---|
| 2003/0184663 A1* | 10/2003 | Nakano | H04N 1/4092 348/241 |
| 2006/0279585 A1 | 12/2006 | Milanfar et al. | |
| 2007/0217713 A1 | 9/2007 | Milanfar et al. | |
| 2008/0175508 A1 | 7/2008 | Bando et al. | |
| 2008/0175509 A1 | 7/2008 | Wheeler et al. | |
| 2009/0046944 A1 | 2/2009 | Bilcu et al. | |
| 2009/0245688 A1* | 10/2009 | Robinson | G06T 5/50 382/284 |
| 2010/0080487 A1* | 4/2010 | Yitzhaky | G06T 5/003 382/266 |
| 2010/0016633 A1 | 7/2010 | Lee et al. | |
| 2010/0188528 A1* | 7/2010 | Iwata | H04N 5/772 348/231.99 |
| 2010/0215282 A1* | 8/2010 | Van Beek | G06T 3/4007 382/255 |
| 2010/0310165 A1* | 12/2010 | Chen | G06T 5/003 382/167 |
| 2011/0033132 A1* | 2/2011 | Ishii | G06T 5/003 382/275 |
| 2011/0096180 A1 | 4/2011 | McCloskey et al. | |
| 2012/0042291 A1 | 2/2012 | Granik et al. | |
| 2012/0076362 A1* | 3/2012 | Kane | G06T 5/003 382/106 |
| 2012/0105655 A1* | 5/2012 | Ishii | G06T 5/003 348/208.4 |
| 2013/0033608 A1 | 2/2013 | Hong | |
| 2013/0169824 A1 | 7/2013 | Hong et al. | |
| 2013/0242129 A1* | 9/2013 | Harmeling | G06T 5/001 348/222.1 |
| 2014/0002673 A1* | 1/2014 | Wu | H04N 17/002 348/187 |
| 2014/0078320 A1 | 3/2014 | Hong | |
| 2014/0140626 A1* | 5/2014 | Cho | G06T 5/003 382/199 |
| 2014/0140633 A1* | 5/2014 | Wang | G06K 9/6255 382/255 |
| 2014/0169694 A1* | 6/2014 | Yoshikawa | G06T 5/001 382/260 |
| 2014/0348441 A1 | 11/2014 | Tezaur | |
| 2014/0355901 A1 | 12/2014 | Tezaur | |
| 2015/0070511 A1* | 3/2015 | Williams | H04N 17/002 348/188 |

FOREIGN PATENT DOCUMENTS

| | | |
|---|---|---|
| WO | WO2011139288 A1 | 11/2011 |
| WO | WO2012060835 A1 | 5/2012 |
| WO | WO2013025220 A1 | 2/2013 |
| WO | WO2013148139 A1 | 10/2013 |
| WO | WO2013148142 A1 | 10/2013 |
| WO | WO2014074137 A1 | 5/2014 |
| WO | WO2014074138 A1 | 5/2014 |
| WO | WO2015017194 A1 | 2/2015 |
| WO | WO2015047538 A1 | 4/2015 |

OTHER PUBLICATIONS

Wang, et al., "A New Alternating Minimization Algorithm for Total Variation Image Reconstruction", SIAM J. Imaging Sciences, vol. I, No. 3(2008), pp. 248-272, © 2008 Society for Industrial and Applied Mathematics.

Sroubek, et al., "Robust Multichannel Blind Deconvolution via Fast Alternating Minimization", IEEE Transactions on Image Processing, 2012.

Wang, et al., "Analyzing Image Deblurring Through Three Paradigms", IEEE Transactions on Image Processing, pp. 115-129, 2012.

Whyte, et al., "Deblurring Shaken and Partially Saturated Images", ICCV 2011.

Lee, et al., "High-quality Non-blind Image Deconvolution with Adaptive Regularization", available online Jul. 23, 2011, pp. 653-663, J. Vis. Communication, Image R. © 2011 Elsevier Inc.

Xu, et al., "Two-Phase Kernel Estimation for Robust Motion Deblurring", ECCV 2010, pp. 157-170, Part I, LNCS 6311, Department of Computer Science and Engineering, The Chinese University of Hong Kong, © Springer-Verlag Berlin Heidelberg 2010.

Krishnan, et al., "Fast Image Deconvolution using Hyper-Laplacian Priors", Neural Information Processing Systems 2009.

Yang, et al., "An Efficient TVL1 Algorithm for Deblurring Multichannel Images Corrupted by Impulsive Noise", SIAM J. Sci. Comput. 31, pp. 1-20, Dept. of Mathematics, Nanjing Univ. P.R. China, Dept. of Computational and Applied Mathematics, Rice University, Houston, TX USA, 2009.

Whyte, et al., "Non-uniform Deblurring for Shaken Images", In Proc. CVPR 2010.

Kumar, et al., "Real-Time Affine Global Motion Estimation Using Phase Correlation and Its Application for Digital Image Stabilization", Trans. On Image Processing, IEEE, Dec. 2011.

Hirsch, et al., "Fast Removal of Non-uniform Camera Shake", In Proc. IEEE, ICCV 2011.

Bae, et al. "Patch Mosaic for Fast Motion Deblurring", ACCV 2012.

Cho, et al., "Handling Outliers in Non-Blind Image Deconvolution", ICCV 2011.

Dolui, et al., "Blind Deconvolution of Medical Ultrasound Images Using Variable Splitting and Proximal Point Methods", Biomedical Imaging: From Nano to Macro, IEEE International Symposium, Mar. 2011.

Shan, et al., "High-Quality Motion Deblurring from a Single Image", ACM SIGGRAPH, New York, NY, USA, Article 73, 2008.

Esser, Ernie, "Applications of Lagrangian-Based Alternating Direction Methods and Connections to Split Bregman", Tech Rep. 09-31, UCLA, Mar. 2009.

International Searching Search Report and Written Opinion of the International Searching Authority for PCT/US2014/049188, Nikon Corporation, dated Dec. 22, 2014 (related application). **(.244.PCT).

Bar et al. "Restoration of Images with Piecewise Space-Variant Blur". Scientific Conference 2007.

Jirik et al: "Two-dimensional blind inerative deconvolution of medical ultrasound images". Ultrasonics Symposium, 2004 IEEE Montreal, Canada Aug. 23-27, 2004, Piscataway, NJ, USA, IEEE, vol. 2, Aug. 23, 2004 (Aug. 3, 2004), pp. 1262-1266, XP010784187. ISBN: 978-0-7803-8412-5.

Kapur, J.N. et al: "A New Method for Gray-Level Picture Thresholding Using the Entropy of the Histogram" Computer Vision Graphics and Image Processing, Academic Press, Duluth, MA, US, vol. 29, No. 3, Mar. 1, 1985 (Mar. 1, 1985), pp. 273-285, XP000566411.

Kee et al: "Modeling and Removing Spatially-Varying Optical Blur". Computational Photography (ICCP), 2011 IEEE International Conference, Apr. 8, 2011, Pittsburgh, PA.

International Preliminary Report on Patentability (dated Apr. 5, 2016), and Written Opinion of the International Searching Authority for PCT/US2014/049188, Nikon Corporation (dated Dec. 22, 2014) (related application). ** (.244.PCT).

* cited by examiner

POINT SPREAD FUNCTION ESTIMATION OF OPTICS BLUR

RELATED APPLICATION

This application claims priority on U.S. Provisional Application No. 62/083,703, filed Nov. 24, 2014 and entitled "POINT SPREAD FUNCTION ESTIMATION OF OPTICS BLUR." This application claims priority on U.S. Provisional Application No. 62/096,988, filed Dec. 26, 2014 and entitled "POINT SPREAD FUNCTION ESTIMATION OF OPTICS BLUR." This application is continuation in part of on International Application No. PCT/US14/49188, filed Jul. 31, 2014, and entitled "PSF ESTIMATION USING MULTIPLE SMALLER IMAGES." International Application No. PCT/US14/49188 claims priority on U.S. Provisional Application No. 61/884,649 filed on Sep. 30, 2013.

As far as permitted, the contents of U.S. Provisional Application Nos. 61/884,649; 62/083,703; and 62/096,988 are incorporated herein by reference. Further, as far as permitted, the contents of International Application No. PCT/US14/49188 are incorporated herein by reference.

BACKGROUND

Cameras are commonly used to capture an image of a scene that includes one or more objects. Unfortunately, the images can be blurred. For example, a lens assembly used by the camera always includes lens aberrations that can cause noticeable blur in each image captured using that lens assembly under certain shooting conditions (e.g. certain f-number, focal length, etc).

Blur caused by lens aberrations is spatially variant (varies dependent on field position). However, it is possible to approximate the blur caused by lens aberrations locally using a spatially invariant convolution model as follows, $$B = K*L + N. \quad \text{Equation (1)}.$$

In Equation (1) and elsewhere in this document, (i) "B" represents a blurry image, (ii) "L" represents a latent sharp image, (iii) "K" represents a point spread function ("PSF") kernel, and (iv) "N" represents noise (including quantization errors, compression artifacts, etc.).

A non-blind PSF problem seeks to recover the PSF kernel K when the latent sharp image L is known.

One common approach to solving a PSF estimation problem includes reformulating it as an optimization problem in which a suitable cost function is minimized. A common cost function can consist of (i) one or more fidelity terms, which make the minimum conform to equation (1) modeling of the blurring process, and (ii) one or more regularization terms, which make the solution more stable and help to enforce prior information about the solution, such as sparseness.

An example of such a PSF cost function is $$c(K) = \|L*K - B\|_p^p + \gamma \|D*K\|_q^q. \quad \text{Equation (2)}$$

In Equation (2), and elsewhere in this document, (i) c(K) is the Point Spread Function estimation cost function, (ii) D denotes a regularization operator, (iii) $\|L*K-B\|_p^p$ is a fidelity term that forces the solution to satisfy the blurring model in Equation (1) with a noise term that is small, (iv) $\|D*K\|_q^q$ is a regularization term that helps to infuse prior information about arrays that can be considered a PSF kernel, (v) γ is a regularization weight that is a selected constant that helps to achieve the proper balance between the fidelity and the regularization terms (vi) the subscript p denotes the norm or pseudo-norm for the fidelity term(s) that results from assuming a certain probabilistic prior distribution modeling, (vii) the superscript p denotes the power for the fidelity term(s), (viii) the subscript q denotes the norm for the regularization term(s) that results from assuming a certain probabilistic prior distribution modeling, and (ix) the superscript q denotes the power for the regularization term(s).

When the noise and/or noise derivatives (depending on whether or not there are derivatives in the fidelity term) are assumed to follow a Gaussian distribution, the power p for the fidelity term(s) is equal to two (p=2); and when the image derivatives are assumed to follow a Gaussian distribution, the power q for the regularization term(s) is equal to two (q=2). This can be referred to as a "Gaussian prior". It should be noted that p=2 is the most common choice and the corresponding cost function is then referred to as a regularized least squares cost function.

Alternatively, when the noise and/or noise derivatives are assumed to follow a Laplacian distribution, the power p for the fidelity term(s) is equal to one (p=1); and when the image derivatives are assumed to follow a Laplacian distribution, the power q for the regularization term(s) is equal to one (q=1). This can be referred to as a "Laplacian prior".

Still alternatively, when the noise and/or noise derivatives are assumed to follow a hyper-Laplacian distribution, the power p for the fidelity term(s) is less than one (p<1); and when the image derivatives are assumed to follow a hyper-Laplacian distribution, the power q for the regularization term(s) is less than one (q<1). This can be referred to as a "hyper-Laplacian prior".

For the example, if a 2-norm is used in the fidelity and regularization terms of Equation (2) (i.e., p=2), then a non-exclusive example of a closed form formula for the cost function of Equation 2 minimum is as follows:

$$F(K) \approx \frac{\overline{F(L)}F(B)}{\overline{F(L)}F(L) + \gamma \overline{F(D)}F(D)}. \quad \text{Equation (3)}$$

In Equations (2) and (3), the regularization term is necessary to compensate for zero and near-zero values in F(L).

Unfortunately, existing methods for estimating the optics blur of a lens assembly of a camera are not entirely adequate and may not produce sufficiently accurate optics point spread functions ("PSFs").

SUMMARY

The present invention is directed to a method for estimating one or more arrays of optics point spread functions ("PSFs") of a lens assembly. In one embodiment, the method includes the steps of: (i) providing a test chart; (ii) providing a capturing system; (iii) capturing a test chart image of the test chart with the capturing system using the lens assembly to focus light onto the capturing system; (iv) selecting a first image area from the test chart image; (v) dividing the first image area into a plurality of first area blocks; and (vii) estimating a first area optics point spread function of the first image area using a PSF cost function that sums the fidelity terms of at least two of the first area blocks.

Additionally, the method can include the steps of selecting a second image area from the test chart image, dividing the second image area into a plurality of second area blocks, and estimating a second area optics point spread function of the second image area.

As provided herein, the test chart can be a physical object or a projected image of a test chart.

In one embodiment, the test chart can include a first tile set and a second tile set. In this embodiment, each tile set can include a rectangular shaped first tile and a rectangular shaped second tile that is spaced apart from the first tile. As a result thereof, the test chart image will include a first image set and a second image set, with each image set including a first tile image of the first tile and a second tile image of the second tile that is spaced apart from the first tile image. In this example, the first image area includes the first tile image and the second tile image of the first image set; and the second image area includes the first tile image and the second tile image of the second image set.

Additionally, the test chart image can include a third image area. In this example, the method can include the step of estimating a third area optics point spread function of the third image area using a PSF cost function that sums the fidelity terms of at least two of the third area blocks.

In another embodiment, the test chart includes a first tile set, a second tile set, and a third tile set, with each tile set including a rectangular shaped first tile and a rectangular shaped second tile that is spaced apart from the first tile. As a result thereof, the test chart image includes a first image set, a second image set, and a third image set, with each image set including a first tile image of the first tile and a second tile image of the second tile that is spaced apart from the first tile image. In this example, the first image area can include the first tile image and the second tile image of the first image set; the second image area can include the first tile image and the second tile image of the second image set; and the third image area can include the first tile image and the second tile image of the third image set.

In one embodiment, the first tile has a white pattern on a black background. For example, the white pattern can include a white pattern of random dots on a black background.

In another embodiment, the test chart includes a tile set having a rectangular shaped first tile, a rectangular shaped second tile that is spaced apart from the first tile, and a rectangular shaped third tile that is spaced apart from the first and second tiles. As a result thereof, the test chart image includes a first tile image of the first tile, a second tile image of the second tile that is spaced apart from the first tile image, and a third tile image of the third tile that is spaced apart from the first and second tile images. In this example, the first image area includes the first tile image, the second tile image, and the third tile image.

In yet another embodiment, the present invention includes a system for estimating an array of optics point spread functions of a lens assembly, the system comprising: (i) a test chart having a test chart pattern; (ii) a capturing system that captures a test chart image of the test chart with the capturing system using the lens assembly to focus light onto the capturing system; (iii) a control system that (i) selects a first image area from the test chart image; (ii) divides the first image area into a plurality of first area blocks; and (iii) estimates a first area optics point spread function of the first image area.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
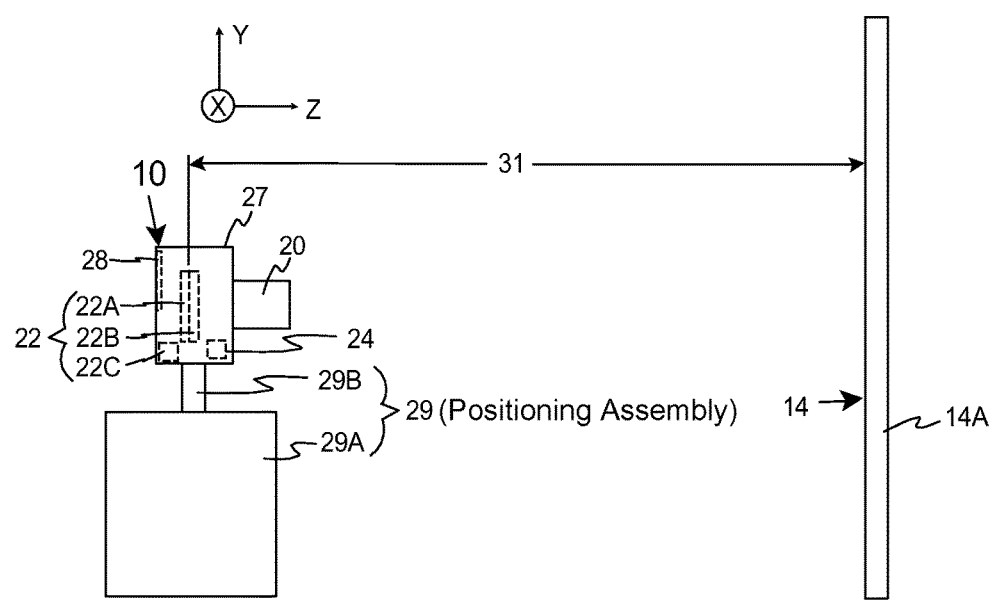
FIG. 1 is a simplified side illustration of an image apparatus, a test chart, and a computer.

FIG. 1 is a simplified side illustration of an image apparatus 10 (e.g. a digital camera), a computer 12 (illustrated as a box), and a test chart 14. As provided herein, the image apparatus 10 is used to capture a test chart image 316 (illustrated in FIG. 3A, and also referred to as a photograph) of the test chart 14. In certain embodiments, the present invention is directed to one or more unique algorithms and methods that are used to accurately estimate one or more optics point spread functions 518 (illustrated in FIG. 5F) of a lens assembly 20 used with the image apparatus 10 using the test chart 14 and the test chart image 316. Further, in certain embodiments, the present invention is directed to an improved test chart 14 that allows for the estimation of more accurate optics point spread functions 518.

Subsequent images (not shown) captured using the lens assembly 20 will have approximately the same optics point spread functions 18 when the same settings such as focal length, f-number, and focus distance are used because the blur is caused by lens aberrations in the lens assembly 20. Thus, if the optics point spread functions 518 are more accurate, the subsequent images captured with the lens assembly 20 can be processed with improved accuracy.

Additionally or alternatively, the optics point spread functions 18 can be used to evaluate the quality of the lens assembly 20.

Moreover, the formulas provided herein can be solved relatively easily. This will speed up the calculation of the optics point spread function 518.

Some of the Figures provided herein include an orientation system that designates an X axis, a Y axis, and a Z axis that are orthogonal to each other. It should be understood that the orientation system is merely for reference and can be varied. Moreover, these axes can alternatively be referred to as the first, the second, or a third axis.

As provided herein, the image apparatus 10 can include a capturing system 22 (e.g. a semiconductor device that records light electronically) that captures the test chart image 316, and a control system 24 that uses one or more of the algorithms for estimating the optics point spread functions 518 for in camera processing. Alternatively, the computer 12 can include a control system 26 that uses one or more of the algorithms for estimating the optics point spread functions 518 using the test chart image 316 and the test chart 14.

As an overview, the captured, test chart image 316 is divided into one or more image areas 490 (illustrated in FIG. 4), and a separate area optics point spread function 518 (illustrated in FIG. 5F) is estimated for each of the image areas 490. The lens aberrations in the lens assembly 20 are spatially variant (varies dependent on field position). As provided herein, the spatially variant blur caused by the lens aberrations can be approximated by using an array of area optics point spread functions 518 that are calculated using a spatially invariant convolution model for each image area 490.

Additionally, the control system 24, 26 can use the optics point spread functions 518 during processing of subsequent images to process subsequent images more accurately and/or to evaluate the quality of the lens assembly 20. If these optics point spread functions are subsequently used for image restoration, the process of estimating PSFs and the process of restoring the image are completely separate. The optics point spread functions 518 are estimated beforehand and saved. Then, after a regular image is captured, the optics point spread functions 518 are used for blur removal (performing non-blind deconvolution).

Each control system 24, 26 can include one or more processors and circuits. Further, either of the control systems 24, 26 can include software that utilizes one or more methods and formulas provided herein.

The capturing system 22 captures information for the test chart image 316. The design of the capturing system 22 can vary according to the type of image apparatus 10. For a digital type camera, the capturing system 22 can include an image sensor 22A (illustrated in phantom), a filter assembly 22B (illustrated in phantom), and a storage system 22C (illustrated in phantom) such as random-access memory.

The image sensor 22A receives the light that passes through the filter assembly 22B and converts the light into electricity. One non-exclusive example of an image sensor 22A for digital cameras is known as a charge coupled device ("CCD"). An alternative image sensor 22A that may be employed in digital cameras uses complementary metal oxide semiconductor ("CMOS") technology.

The image sensor 22A, by itself, produces a grayscale image as it only keeps track of the total intensity of the light that strikes the surface of the image sensor 22A. Accordingly, in order to produce a full color image, the filter assembly 22B is necessary to capture the colors of the image. For example, the filter assembly 22B can be a color array filter, such as a Bayer filter.

The lens assembly 20 focuses light onto the image sensor 22A. The lens assembly 20 can include a single lens or a combination of lenses that work in conjunction with each other to focus light onto the capturing system 22. In one embodiment, the image apparatus 10 includes an autofocus assembly (not shown) including one or more lens movers that move one or more lenses of the lens assembly 20 until the sharpest possible image is received by the capturing system 22.

It should be noted that the lens assembly 20 can be removable secured to an apparatus housing 27 of the image apparatus 10. With this design, the lens assembly 20 can be interchanged with other lens assemblies (not shown) as necessary to achieve the desired characteristics of the image apparatus 10. Alternatively, the lens assembly 20 can be fixedly secured to the apparatus housing 27 of the image apparatus 10.

Further, the image apparatus 10 can include an image display 28 (illustrated in phantom with a box) that displays captured, low resolution thru-images, and high resolution images. For example, the image display 28 can be an LED display. In certain embodiments, the image display 28 displays a grid (not shown in FIG. 1) with the thru-images for centering and focusing the image apparatus 10 during the capturing of the high resolution images.

Additionally, a positioning assembly 29 can be used to precisely position the image apparatus 10 relative to the test chart 14 to align the image apparatus 10 and hold the image apparatus 10 steady during the capturing of the test chart image 316 to inhibit motion blur. In one embodiment, the positioning assembly 29 includes a rigid, mounting base 29A and a mover 29B secured to the housing 27 and mounting base 29A. In this embodiment, the mover 29B can be controlled to precisely position the image apparatus 10 along and about the X, Y, and Z axes relative to the test chart 14 to position and center the test chart image 316 on the image sensor 22A.

It should be noted that the image apparatus 10 and the test chart 14 should be in a fixed relationship to each other during the capturing of the test chart image 316 so that motion blur is not present in the test chart image 316. Further, the lens assembly 20 should be properly focused during the capturing of the test chart image 316 so that defocus blur is not present in the test chart image 316. With this arrangement, any blur in test chart image 316 can be attributed to optics blur of the lens assembly 20.

In one embodiment, the test chart 14 includes a test chart substrate 14, and a special test chart pattern (not shown in FIG. 1) positioned thereon. For example, the test chart substrate 14 can be a thick paper with the test chart pattern deposited (e.g. printed) thereon. Alternatively, the test chart substrate 14 can be another material.

It should be noted that with the arrangement illustrated in FIG. 1, the lens assembly 20 focuses the light that forms the test chart image 316 onto the capturing system 22 with the test chart 14 positioned a first focal distance 31 from the capturing system 22. With this arrangement, first focal distance 31 is dictated by the size of the test chart 14 and the characteristics of the lens assembly 20 because the camera 10 is positioned so that the test chart 14 fills the entire capturing system 22.

Further, with this design, the estimated optics point spread functions 518 correspond to the blur that results from the lens abbreviations in the lens assembly 20 that occur at the first focal distance 31. Subsequent images (not shown) captured using the lens assembly 20 will have approximately the same optics point spread functions 18 when the same settings such as focal length, f-number, and focus distance are used because the blur is caused by lens aberrations in the lens assembly 20.

It should be noted that different sized test charts (not shown in FIG. 1) can be used with other focal distances (not shown in FIG. 1) to estimate the optics point spread functions for the lens assembly 20 at the other focal distances. A non-exclusive example of an assembly 2500 that will allow for the testing of the lens assembly 20 at a plurality of alternative focus distances is described below in reference to FIG. 25. With this design, a separate set 2600 (illustrated in FIG. 26), 2700 (illustrated in FIG. 27), 2800 (illustrated in FIG. 28) of arrays of optics point spread functions can be generated for each alternative focus distance 2531A, 2531B, 2531C.

Figure 2A:
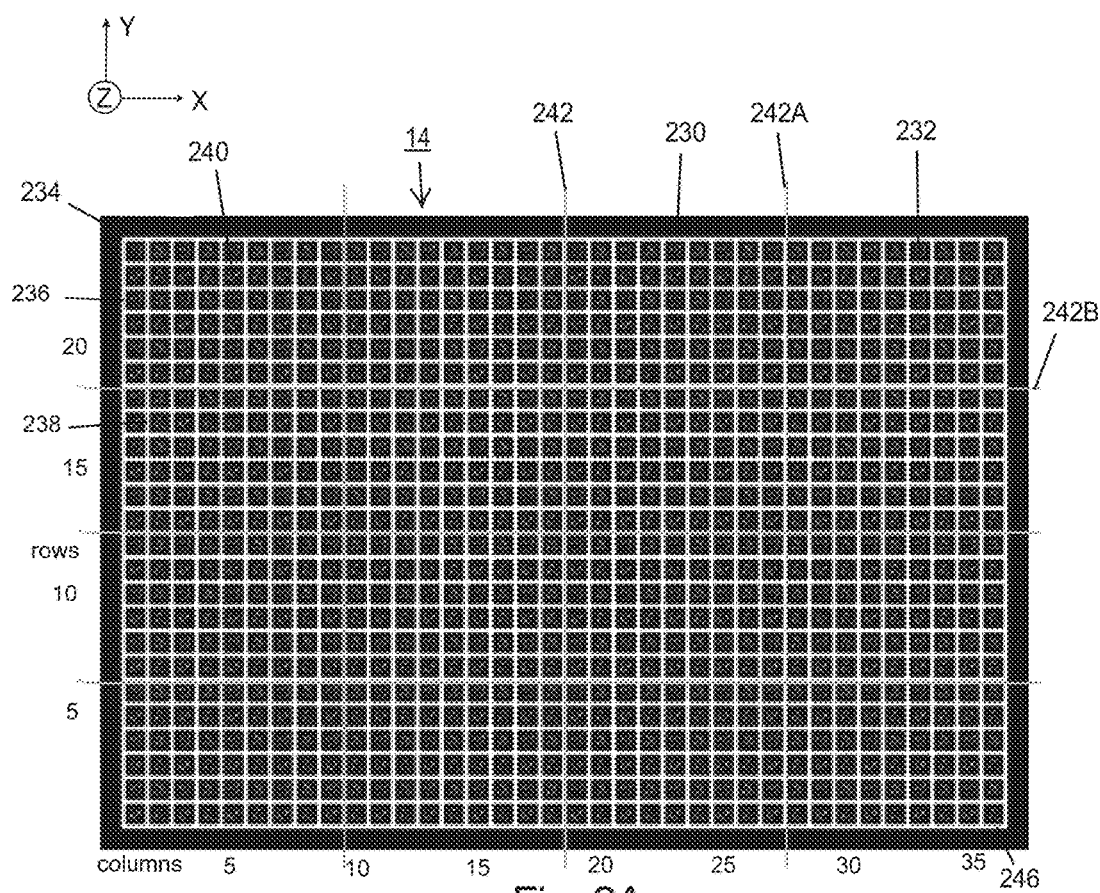
FIG. 2A is a front plan view of a test chart that includes a plurality of chart tiles.

FIG. 2A illustrates a front plan view of one, non-exclusive embodiment of the test chart 14. In this embodiment, the test chart 14 includes the special test chart pattern 230 that includes a plurality of chart tiles 232 that are arranged in a rectangular array. The size, number, and design of the test chart pattern 230 and the chart tiles 232 can be varied to change the characteristics of the test chart 14.

In the non-exclusive embodiment illustrated in FIG. 2A, the test chart 14 includes eight hundred and sixty four, individual, spaced apart, square shaped, chart tiles 232 that are arranged in a twenty-four (rows) by thirty-six (columns) rectangular shaped array. In this embodiment, the test chart 14 includes an outer perimeter 234 that encircles the test chart pattern 230, the outer perimeter 234 including four sides that are arranged as a rectangular frame. Further, in this embodiment, the test chart pattern 230 includes (i) a rectangular shaped outer frame 236 that is encircled by the outer perimeter 234, (ii) thirty-five, spaced apart, vertical dividers 238 (vertical lines) that extend vertically (along the Y axis) and that are equally spaced apart horizontally (along the X axis), and (iii) twenty-three, spaced apart, horizontal dividers 240 (horizontal lines) that extend horizontally (along the X axis) and that are equally spaced apart vertically (along the Y axis). In this embodiment, the outer frame 236, the thirty-five, spaced apart, vertical dividers 238, and the twenty-three, spaced apart, horizontal dividers 240 cooperate to form the eight hundred and sixty four chart tiles 232 that are arranged in the twenty-four by thirty-six array.

In one non-exclusive embodiment, the test chart 14 has a size approximately forty inches by sixty inches, and each chart tile 232 can be approximately 1.4 inches by 1.4 inches. Alternatively, the size, shape and/or arrangement of the chart pattern 230 and/or the chart tiles 232 can be different than that illustrated in FIG. 2A.

Figure 2B:
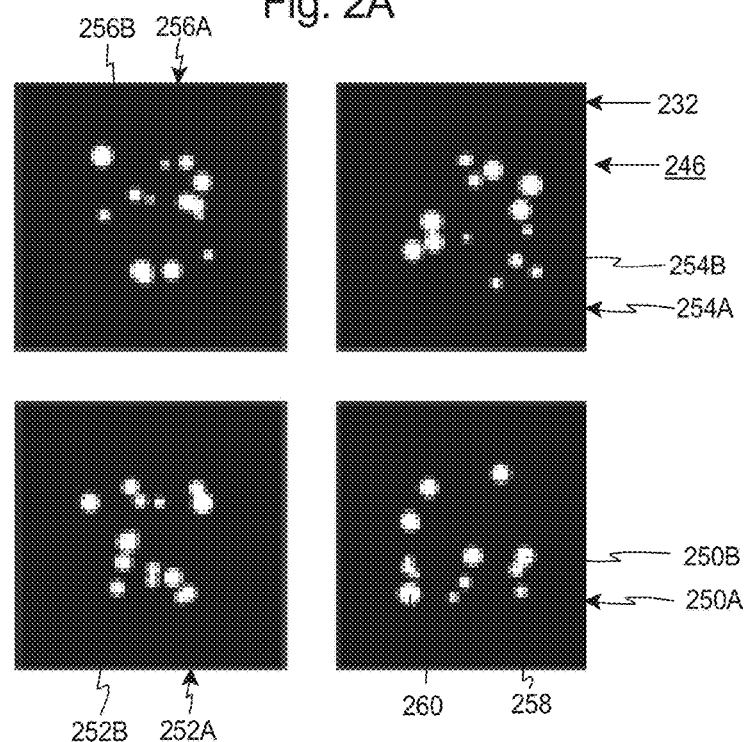
FIG. 2B is a front plan view of a set of chart tiles from the test chart of FIG. 2A.
Figure 2C:
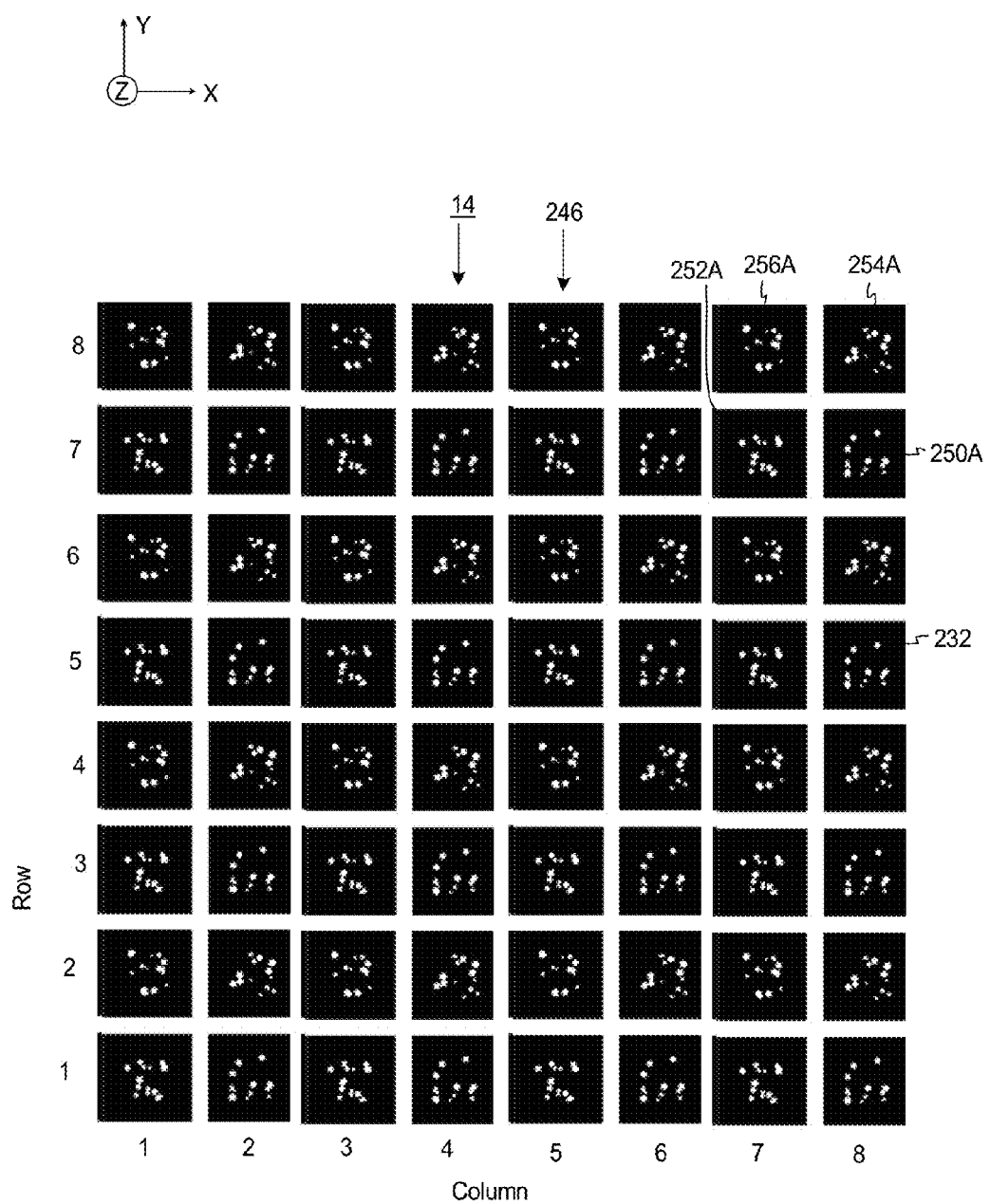
FIG. 2C is a front plan view of a plurality of chart tiles from the test chart of FIG. 2A.
Figure 3A:
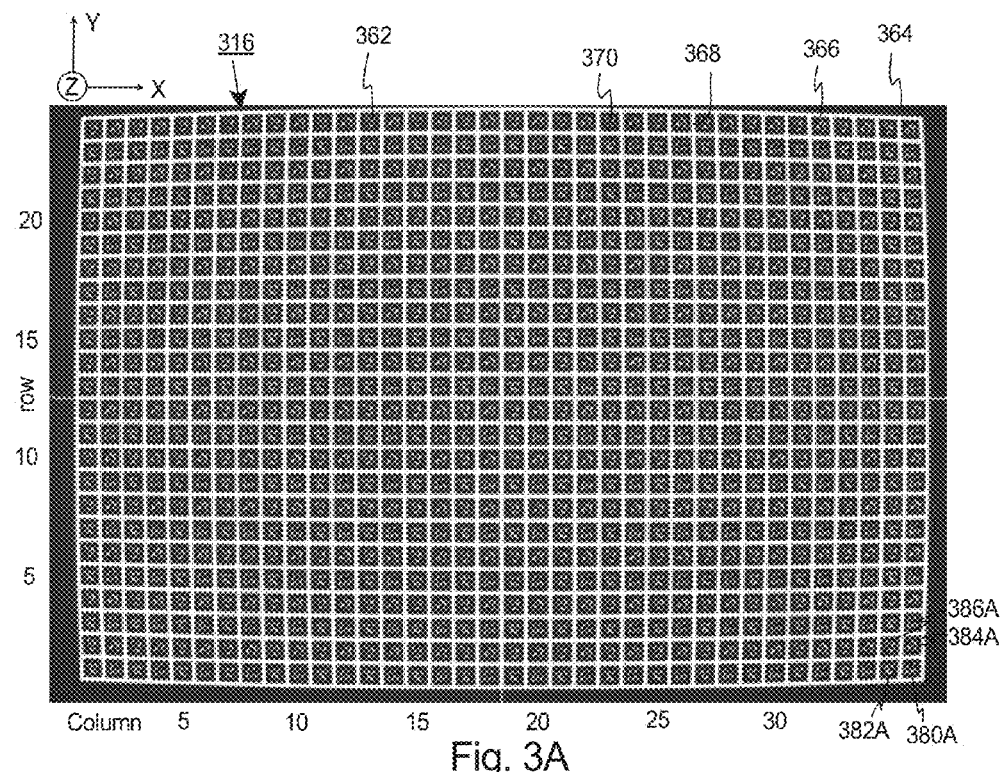
FIG. 3A is a front plan view of a test chart image captured with the image apparatus of FIG. 1.

In certain embodiments, the test chart pattern 230 illustrated in FIG. 2A assists in aligning the image apparatus 10 (illustrated in FIG. 1) to the test chart 14, and supports automatic processing of test chart images 316 (illustrated in FIG. 3A). As provided above, in certain embodiments, the image display 28 (illustrated in FIG. 1) displays a grid 242 that appears in the thru-images for centering and focusing the image apparatus 10. It should be noted that the grid 242 in FIG. 2 is superimposed over the test chart 14 in FIG. 2A for ease of understanding. However, in actual situations, the grid 242 is not positioned on the test chart 14 and is only visible in the image display 28 with a thru-image of the test chart 14.

In one non-exclusive embodiment, the grid 242 includes a plurality of spaced apart vertical lines 242A (e.g. three in FIG. 2A), and a plurality of spaced apart horizontal lines 242B (e.g. three in FIG. 2A). As provided herein, in certain embodiments, during alignment, and while monitoring the thru images on the image display 28, the image apparatus 10 can be moved and positioned relative to the test chart 14 until the vertical lines 242A of the grid 242 (visible in the image display 28) correspond to some of the vertical dividers 238 in the test chart pattern 230 as captured in the thru images, and the horizontal lines 242B of the grid 242 (visible in the image display 28) correspond to some of the horizontal dividers 240 in the test chart pattern 230 as captured in the thru images. Thus, the image apparatus 10 can be moved until the grid 242 in the image display 28 coincides with proper dividers 238, 240 separating chart tiles 232 as captured in the thru images. This aids in the camera-chart alignment.

In the non-exclusive embodiment illustrated in FIG. 2A, (i) the outer perimeter 234 is black in color, (ii) the outer frame 236, the vertical dividers 238, and the horizontal dividers 240 are white in color, and (iii) each chart tile 232 has a black background and white features. Alternatively, the colors can be different than that illustrated in FIG. 2A. For example, the black and white colors can be reversed, e.g. (i) the outer perimeter 234 is white in color, (ii) the outer frame 236, the vertical dividers 238, and the horizontal dividers 240 are black in color, and (iii) each chart tile 232 has a white background and black features.

It should be noted that the two color (black and white) test chart pattern 230 does not require careful color calibration when test charts 14 are printed. Further, simulations indicate that more accurate estimates of the optical point spread function 18 are achieved with white dividers 238, 240 separating the black chart tiles 232 having white patterns (white patterns on black background), than with the colors reversed (black patterns on white background)

Moreover, the white dividers 238, 240 separating the black chart tiles 232 are easy to detect in the captured images even when the image apparatus 10 is not perfectly aligned with the test chart 14 and even in the presence of strong geometric distortion and vignetting of the captured images.

Further, the rectangular shape of the test chart pattern 230 can be used in the compensation for the geometric distortion of the test chart image 316 during processing as discussed in more detail below.

In one embodiment, the plurality of chart tiles 232 are divided in four different tile patterns that are periodically repeated. Stated in another fashion, the plurality of chart tiles 232 can be divided into a plurality of tile sets 246, with each tile set 246 including four (different or the same) chart tiles 232. In this embodiment, each of the chart tiles 232 in the tile set 246 has a different pattern, but each tile set 246 is similar. Thus, with this design, in FIG. 2A, the eight hundred and sixty four chart tiles 232 are divided into two hundred and sixteen tile sets 246 that are positioned adjacent to each other. It should be noted that any of the tile sets 246 can be referred to as a first, second, third, fourth, etc. tile set.

Alternatively, the plurality of chart tiles 232 can be divided in more than four or less than four different tile patterns that are periodically repeated. Further, each tile set 246 can be designed to include more than four or fewer than four different chart tiles 232.

Alternatively, each tile set can have a different number or pattern of chart tiles.

It should be noted that the thirty-six columns and twenty-four rows of chart tiles 232 are labeled in FIG. 2A so that the individual chart tiles 232 can be individually identified by the column and row number. For example, the chart tile 232 in the upper left corner of the test chart 14 can be identified as [chart tile 1, 24] to designate the chart tile image 232 in the first column, and the twenty-fourth row. The other chart tiles 232 can be identified in a similar fashion.

FIG. 2B illustrates a front plan view of one tile set 246 that includes four adjacent chart tiles 232, taken from the lower right corner of the test chart 14 of FIG. 2A. In this non-exclusive embodiment, the tile set 246 includes (i) a first tile 250A having a first tile pattern 250B, (ii) a second tile 252A having a second tile pattern 252B that is different than the first tile pattern 250B, (iii) a third tile 254A having a third tile pattern 254B that is different than the first tile pattern 250B and the second tile pattern 252B, and (iv) a fourth tile 256A having a fourth tile pattern 256B that is different than the first tile pattern 250B, the second tile pattern 252B, and the third tile pattern 254B. Stated in another fashion, the tile set 246 includes four different and neighboring tiles 232 (each with a different patterns 250B, 252B, 254B, 256B).

In this embodiment, each tile 250A, 252A, 254A, 256A is the same size and shape. Moreover, in this embodiment, each tile pattern 250B, 252B, 254B, 256B of the tile set 246 has a black background 258, and a different set of white features 260. In this non-exclusive embodiment, the features 260 in each tile pattern 250B, 252B, 254B, 256B of the tile set 246 includes small white circles of different sizes that are distributed in a random fashion. More specifically, in this embodiment, (i) the first tile pattern 250B has a first random pattern of small white circles, (ii) the second tile pattern 252B has a second random pattern of small white circles that is different from the first random pattern, (iii) the third tile pattern 254B has a third random pattern of small white circles that is different from the first random pattern and the second random pattern, and (iv) the fourth tile pattern 256B has a fourth random pattern of small white circles that is different from the first random pattern, the second random pattern, and the third random pattern.

In this embodiment, the four random patterns are specially designed based on theoretical analysis (taking into account spectral properties) and verified by experiments with artificially blurred images. Alternatively, other types of random patterns are possible. In certain embodiments, each of the random patterns 250B, 252B, 254B, 256B are designed to have a good power spectrum.

FIG. 2C illustrates a front plan view of sixteen tile sets 246 (each including four adjacent chart tiles 232) taken from the lower left corner of the test chart 14 of FIG. 2A. In this embodiment, each tile set 246 is the same, and the plurality of chart tiles 232 are divided in four different tiles 250A, 252A, 254A, 256A that are periodically repeated.

The eight columns and eight rows of chart tiles 232 are labeled in FIG. 2C so that the individual chart tiles 232 can be individually identified by the column and row number.

Figure 3B:
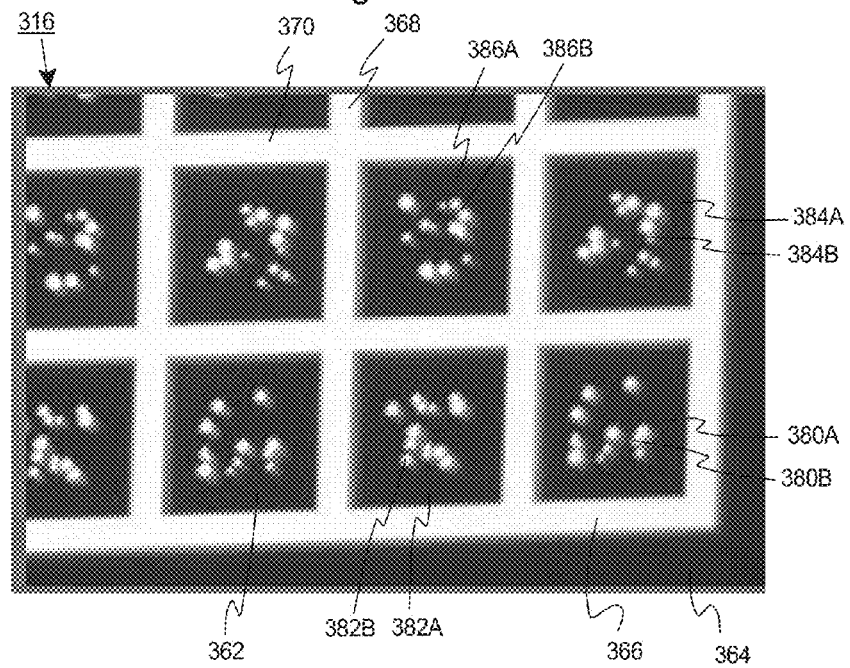
FIG. 3B is a front plan view of a portion of test chart image of FIG. 3A.

FIG. 3A illustrates the captured test chart image 316 from FIG. 1, and FIG. 3B illustrates an enlarged portion 316 of the lower right hand corner of the test chart image 316 of FIG. 3A. In this embodiment, the test chart image 316 is a captured image of the test chart 14 of FIG. 2A. As a result thereof, the test chart image 316 includes eight hundred and sixty four, individual, spaced apart, substantially square shaped, tile images 362 that are arranged in a twenty-four (rows) by thirty-six (columns) somewhat rectangular shaped array. More specifically, as a result of the design of the test chart 14, the test chart image 316 includes an image outer perimeter 364 that including four sides that are arranged as a substantially rectangular frame. Further, in this embodiment, the test chart image 316 includes (i) a generally rectangular shaped image outer frame 366 that is encircled by the image outer perimeter 364, (ii) thirty-five, spaced apart, image vertical dividers 368 (vertical lines) that extend substantially vertically (along the Y axis) and that are equally spaced apart horizontally (along the X axis), and (iii) twenty-three, spaced apart, image horizontal dividers 370 (horizontal lines) that extend substantially horizontally (along the X axis) and that are equally spaced apart vertically (along the Y axis). In this embodiment, the image outer frame 366, the thirty-five, spaced apart, image vertical dividers 368, and the twenty-three, spaced apart, image horizontal dividers 370 cooperate to form the eight hundred and sixty-four tile images 362 that are arranged in the twenty-four by thirty-six array.

Further, as a result of the test chart 14, (i) the image outer perimeter 364 is black in color, (ii) the image outer frame 366, the image vertical dividers 368, and the image horizontal dividers 370 are white in color, and (iii) each tile image 362 has a black background and white features.

It should be noted that the test chart image 316 includes some geometric distortion and/or vignetting. Because of geometric distortion, the dividers 368, 370 are slightly curved, and the tile images 362 are not exactly square in shape. Vignetting causes the image to be gradually darker as you move from the center of the frame towards the perimeter. Images captured with small f-stop numbers can exhibit significant vignetting.

Because of the unique design of the test chart 14, it is relatively easy for the control system 24, 26 (illustrated in FIG. 1) to locate and segment the individual tile images 362 from the test chart image 316 even in the presence of significant geometric distortion and vignetting.

Additionally, because the chart tiles 232 of the test chart 14 are square, it is relatively easy to individually estimate the geometric distortion of each of the tile images 362 based on how far each of these tile images 362 are away from being square. Further, the estimated geometric distortion can be compensated for to increase the accuracy of the estimation of the optics point spread function 518 (illustrated in FIG. 5F).

In one embodiment, as a result of the test chart 14 design described above and illustrated in FIGS. 2A-2C, the plurality of tile images 262 can be divided in four different tile pattern images that are periodically repeated. In this non-exclusive embodiment, the tile images 362 include (i) for each first tile 250A (illustrated in FIGS. 2B, 2C), a separate first tile image 380A having a first pattern image 380B, (ii) for each second tile 252A (illustrated in FIGS. 2B, 2C), a separate second tile image 382A having a second pattern image 382B that is different than the first pattern image 380B, (iii) for each third tile 254A (illustrated in FIGS. 2B, 2C), a separate third tile image 384A having a third pattern image384B that is different than the first pattern image 380B and the second pattern image 382B, and (iv) for each fourth tile 256A (illustrated in FIGS. 2B, 2C), a separate fourth tile image 386A having a fourth pattern image 386B that is different than the first pattern image 380B, the second pattern image 382B, and the third pattern image 384B.

Further, the tile images 380A, 382A, 384A, 386A are periodically repeated in the test chart image 316. Thus, the eight hundred and sixty four tile images 362 of the test chart image 316 includes (i) two hundred and sixteen first tile images 380A, (ii) two hundred and sixteen second tile images 382A, (iii) two hundred and sixteen third tile images 384A, and (iv) two hundred and sixteen fourth tile images 386A that are periodically repeated.

It should be noted that (i) each of the first tile images 380A can be slightly different from each of the other first tile images 380A because of optical blur, geometric distortion, and vignetting; (ii) each of the second tile images 382A can be slightly different from each of the other second tile images 382A because of the optical blur, geometric distortion, and vignetting; (iii) each of the third tile images 384A can be slightly different from each of the other third tile images 384A because of the optical blur, geometric distortion, and vignetting; and (iv) each of the fourth tile images 386A can be slightly different from each of the other fourth tile images 386A because of the optical blur, geometric distortion, and vignetting.

The thirty-six columns and twenty-four rows of tile images 362 are labeled in FIG. 3A so that the individual tile images 362 can be identified by the column and row number. For example, the tile image 362 in the upper left hand corner can be identified as tile image [tile image 1, 24] to designate the tile image 362 in the first column, and the twenty-fourth row. The other tile images 362 can be identified in a similar fashion.

FIG. 3B illustrates six complete tile images 362, including (i) two, first tile images 380A, (ii) one, second tile image 382A, (iii) two, third tile images 384A, and (iv) one, fourth tile image 386A. A portion of six other tile images 362 are also illustrated in FIG. 3B.

In one non-exclusive embodiment, the resulting size of each tile image 362 is approximately sixty to seventy pixels. Alternatively, each tile image 362 can include more than seventy or less than sixty pixels.

As provided herein, the captured, test chart image 316 is divided into one or more image areas 490 (illustrated in FIG. 4), and a separate area optics point spread function 518 (illustrated in FIG. 5F) is estimated for each of the image areas 490. The lens aberrations in the lens assembly 20 are spatially variant (varies dependent on field position). As provided herein, the spatially variant blur caused by the lens aberrations can be approximated by using an array of area optics point spread functions 518 that are calculated using a spatially invariant convolution model for each image area 490.

Figure 4:
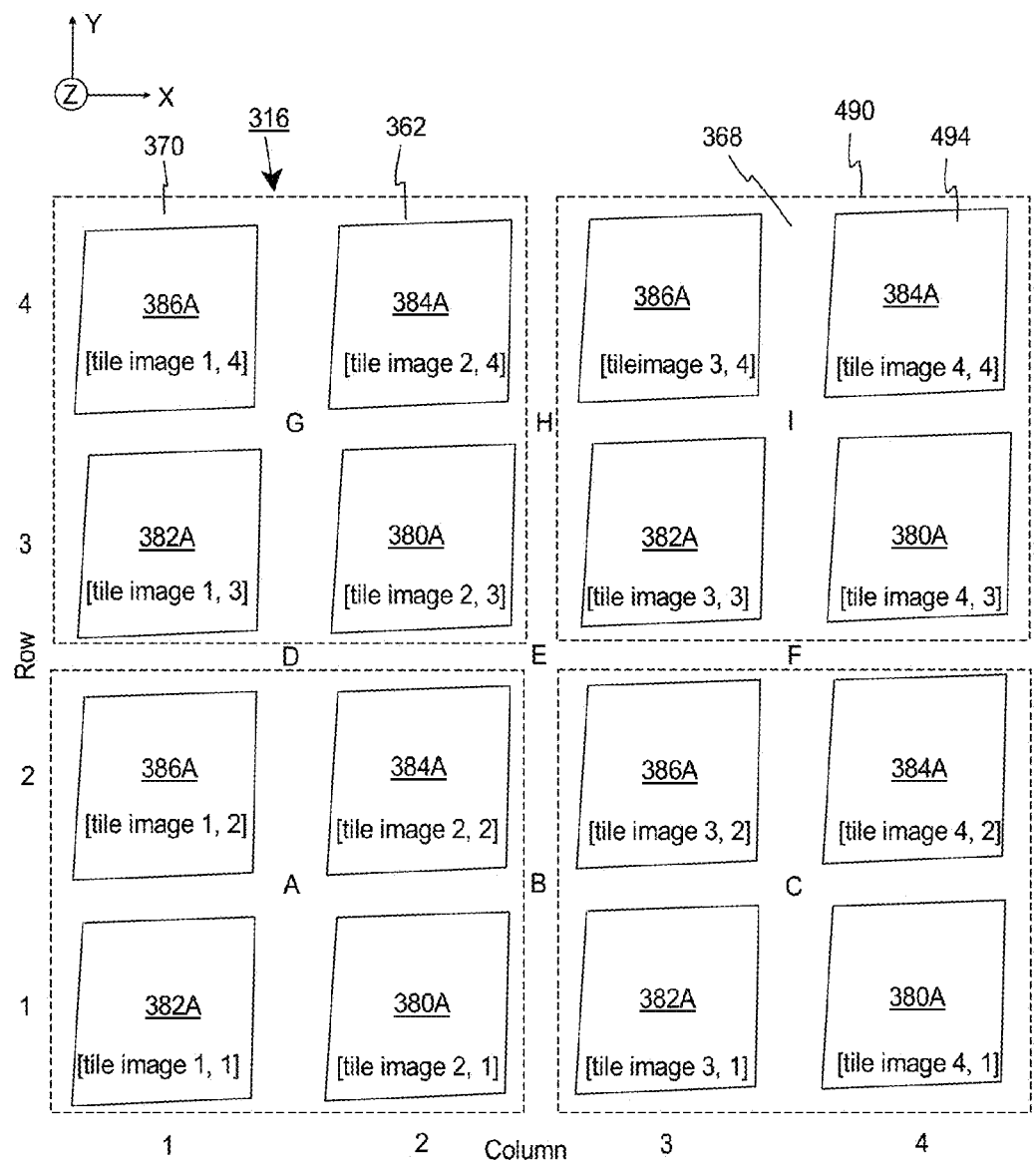
FIG. 4 is a simplified illustration of a portion of the test chart image of FIG. 3A.

Additionally, prior to estimation of each separate area optics point spread function 518, each of the image areas 490 can be divided into a plurality of smaller area blocks 494 (illustrated in FIG. 4). Further, for each image area 490, the new formulas provided herein allow for the simultaneous use of some or all of the smaller area blocks 494 to estimate the separate area point spread function 518.

The size, shape, and number of image areas 490 in which the test chart image 316 is divided can be varied. For example, the test chart image 316 or a portion thereof, can be divided into a plurality of equally sized, square shaped image areas 490. As non-exclusive examples, the test chart image 316 can be divided into ten, twenty, fifty, one hundred, two hundred, three hundred, four hundred, five hundred, six hundred, eight hundred, or more image areas 490. For example, the test chart image 316 of FIG. 3A can be divided into eight hundred and five separate, equally sized, square shaped, image areas 490, with some of the image areas 490 overlapping. Additionally, as provided herein, each of the image areas 490 can be divided into a plurality of smaller area blocks 494. Further, for each image area 490, the new formulas provided herein allow for the simultaneous use of some or all of the smaller area blocks 494 to estimate the separate area optics point spread function 518. With this design, the control system 24, 26 can calculate eight hundred and five separate area point spread functions 518 for the test chart image 316 of FIG. 3A for each color.

FIG. 4 is a simplified illustration of a portion of the test chart image 316 of FIG. 3A taken from the lower, left hand corner. More specifically, FIG. 4 illustrates sixteen tile images 362 (illustrated as boxes), including four, first tile images 380A; four, second tile images 382A; four, third tile images 384A; and four, fourth tile images 386A. The four columns and four rows of tile images 362 are labeled in FIG. 4 so that the individual tile images 362 can be identified by the column and row number.

As provided above, the captured test chart image 316 can be divided into a plurality of image areas 490. In this embodiment, the center of nine separate image areas 490 are represented by the letters A, B, C, D, E, F, G, H, I, respectively. Further, in FIG. 4, the boundary of four image areas 490, namely A, C, G, and I are illustrated with dashed boxes. The boundary for the image areas labeled B, D, E, F, and H is not shown to avoid cluttering FIG. 4. It should be noted that any of the image areas 490 can be referred to as a first image area, a second image area, a third image area, etc. Alternatively, each of these image areas 490 can be referred to as a first image set, a second image set, a third image set, etc.

In one embodiment, each image area 490 is divided into four, square shaped, equally sized, area blocks 494, with each area block 494 being defined by a tile image 362. Stated in another fashion, in this non-exclusive embodiment, each image area 490 includes four tile images 362, namely, one, first tile image 380A; one, second tile image 382A; one, third tile image 384A; and one, fourth tile image 386A.

Stated in yet another fashion, each image area 490 includes four different and neighboring tile images 380A, 382A, 384A, 386A (each with a different pattern 380B, 382B, 384B, 386B) that are used to estimate the area point spread function 518.

With this design, (i) the image area 490 labeled A is at the center of and includes four adjacent tile images 380A [tile image 2,1], 382 A [tile image 1,1], 384A [tile image 2, 2], 386A [tile image 1, 2]; (ii) the image area 490 labeled B is at the center of and includes four adjacent tile images 380A [tile image 2, 1], 382A [tile image 3, 1], 384A [tile image 2, 2], 386A [tile image 3, 2]; (iii) the image area 490 labeled C is at the center of and includes four adjacent tile images 380A [tile image 4, 1], 382A [tile image 3, 1], 384A [tile image 4, 2], 386A [tile image 3, 2]; (iv) the image area 490 labeled D is at the center of and includes four adjacent tile images 380A [tile image 2,3], 382A [tile image 1,3], 384A [tile image 2,2], 386A [tile image 1, 2]; (v) the image area 490 labeled E is at the center of and includes four adjacent tile images 380A [tile image 2, 3], 382A [tile image 3, 3], 384A [tile image 2, 2], 386A [tile image 3, 2]; (vi) the image area 490 labeled F is at the center of and includes four adjacent tile images 380A [tile image 4, 3], 382A [tile image 3, 3], 384A [tile image 4, 2], 386A [tile image 3, 2]; (vii) the image area 490 labeled G is at the center of and includes four adjacent tile images 380A [tile image 2,3], 382A [tile image 1,3], 384A [tile image 2, 4], 386A [tile image 1, 4]; (viii) the image area 490 labeled H is at the center of and includes four adjacent tile images 380A [tile image 2,3], 382A [tile image 3,3], 384A [tile image 2, 4], 386A [tile image 3, 4]; and (ix) the image area 490 labeled I is at the center of and includes four adjacent tile images 380A [tile image 4, 3], 382A [tile image 3, 3], 384A [tile image 4, 4], 386A [tile image 3, 4].

It should be noted that with this design, a separate image area 490 is centered at each intersection of the image vertical dividers 368 and the image horizontal dividers 370. With reference to FIGS. 3A and 4, there are thirty-five image vertical dividers 368, and the twenty-three image horizontal dividers 370 that cooperate to intersect at eight hundred and five separate locations. In this example, this will result in eight hundred and five separate image areas 490 and eight hundred and five, estimated separate area optics point spread functions 518. Stated in another fashion, this will yielding a twenty-three by thirty-five array of local, estimated, area optics point spread functions 518 (one for each intersection of the image dividers 368, 370).

As provided herein, for each image area 490, the simultaneous use of multiple tile images 380A, 382A, 384A, 386A (area blocks) helps to improve the accuracy of the estimated area optics point spread function 518. For example, the new formulas (e.g. cost functions which sum of the fidelity terms from different area blocks 494) can be treated by a closed form formula (when p=q=2) that involves the sum of power spectra of the area blocks 494 in the denominator of a fraction. In other cases, an iterative algorithm needs to be used, but a formula involving the sum of power spectra in the denominator of a fraction then appears in each iteration.

Further, these new formulas improve the accuracy and speed of estimating the area point spread function 518 for each image area 490. One reason is the fewer zeros and near zero values in the combined area block power spectrum will allow for the use of less regularization. Another reason is that the PSF array size needs to be extended only to the size of the area block 494, not the entire image area 490 (which essentially means that additional information is being inserted about the size of the support of area PSF).

As provided above, the captured, test chart image 316 is divided into one or more image areas 490 (illustrated in FIG. 4), and a separate area optics point spread function 518 (illustrated in FIG. 5F) is estimated for each of the image areas 490. Further, the spatially variant blur caused by the lens aberrations can be approximated by using an array of area optics point spread functions 518 that are calculated using a spatially invariant convolution model for each image area 490.

Referring back to FIG. 4, the blurring model for each image area 490 that includes a plurality of area blocks 494 can be expressed as follows:

$$B_1 = L_1 * K + N_1$$
$$B_2 = L_2 * K + N_2$$
$$\vdots$$
$$B_J = L_J * K + N_J.$$

Equation (4)

In Equation (4), for a selected image area 490, (i) the subscript 1 represents one of the area blocks 494 (can also be referred to as the "first area block"); (ii) the subscript 2 represents another of the area blocks 494 (can also be referred to as the "second area block"); (iii) the subscript 3 represents yet another one of the area blocks 494 (can also be referred to as the "third area block"); and (iv) the subscript J represents the "J" area block 494, and J is equal to the number of the area blocks 494 that are being used to determine the area point spread function 518 for the selected image area 490. In the specific example described above, each image area 490 includes four area blocks 494. Thus, in this example, J is equal to four.

In certain embodiments, each area block 494 in a given image area 490 is assumed to have been blurred with the same point spread function.

One non-exclusive example of a PSF cost function based on the blurring model of Equation (4) can be expressed as follows:

$$c(K) = \sum_{j=1}^{J} \|L_j * K - B_j\|_p^p + \gamma \|D * K\|_q^q.$$

Equation (5)

In this example, the PSF cost function is a generalized regularized least squares cost function for the general value of p. Moreover, in Equation 5 and elsewhere in this document, (i) c(K) is the Point Spread Function estimation cost function; (ii) $L_j$ is the latent sharp image that corresponds to area block j; (iii) $B_j$ is the blurry image at area block j; (iii) "K" represents a PSF kernel; (iv) D denotes a regularization operator, (v) γ is a regularization weight that is a selected constant that helps to achieve the proper balance between the fidelity and the regularization terms; (vi) the subscript p denotes the norm or pseudonorm for the fidelity term(s), (vii) the superscript p denotes the power for the fidelity term(s), (viii) the subscript q denotes the norm or pseudonorm for the regularization term(s), (ix) the superscript q denotes the power for the regularization term(s), (x) j is a specific area block, and (xi) J is the total number of area blocks. As provided above, p and q can have a value of 2, 1 or less than 1.

For the example, if a 2-norm is used in the fidelity and regularization terms of Equation (5), then a non-exclusive example of a closed form formula for the cost function of Equation (5) minimum is as follows:

$$F(K) \approx \frac{\sum_{j=1}^{J} \overline{F(L_j)} F(B_j)}{\sum_{j=1}^{J} \overline{F(L_j)} F(L_j) + \gamma \overline{F(D)} F(D)},\quad \text{Equation 6}$$

where F is the Fourier transform operator.

In Equation 6, the power spectra of the area blocks 494 of the image area 490 get added. Because the power spectra are non-negative, if any of them is non-zero, then the sum is non-zero. This makes the algorithm more stable.

In one embodiment, the present invention is directed to non-blind deconvolution method where the latent sharp image is known (the latent sharp image is the test chart 14), and the area optics point spread functions 518 are each being estimated using the single test chart image 316 for the focus distance 31. Alternatively, multiple test chart images 316 can be used in the estimation with a different test chart image 316 being captured at a different focus distance.

In certain embodiments, the test patterns $L_j$ can be selected in such a way that their spectra have no common zeros, or at least as few of them as possible. This can allow for the skipping of regularization entirely or at least make it much weaker than with a single test pattern. The weaker or no regularization will result in a more accurate estimated point spread function. More specifically, many of the problems with the accuracy of PSF estimation come from the first term in the denominator in the Equation (3) (block power spectrum) being zero or close to zero for some frequencies. The second term in the denominator (regularization) is added to prevent the denominator from being zero. When the multiple area blocks 494 are used, the PSF estimation can be more accurate because the first term in the denominator of Equation (6) tends to contain fewer zeros and values close to zero, and thus less regularization is needed.

In the case of optics blur estimation, when the artificially generated test chart 14 is the ideal sharp image, the $L_1$ to $L_J$ that represent the area blocks of the test chart can be chosen in such a way to stay away from zero as much as possible. With the present algorithm, this term is the sum of power spectra of the area blocks 494, which are all non-negative. This means that if, for example, there are some zeros in the power spectrum of $L_1$, that they can be compensated for by choosing $L_2$ in such a way that it has zeroes in different locations. Thus, guaranteeing that adding them will not leave in zeroes that will still need to be taken care of.

It should be noted that the comments regarding zeroes in the power spectrum also apply to cost functions with a power p and/or a power q other than two (2). For these cost functions, a closed form formula equivalent to Equation 6 does not exist, however, when the cost function is minimized by some iterative method (like re-weighted regularized least squares, or alternating minimization derived from variable splitting method), formulas very similar to Equation 6 are used in each iteration.

The basic PSF formula of Equation (5) can be modified in various ways. For example, additional fidelity terms with derivatives (e.g. directional derivatives $D_x$ and $D_y$) can be used in the cost function, individual area blocks 494 can get different weights $\omega$, and/or the regularization terms can be different as provided below:

$$c(K) = \omega_1 \sum_{j=1}^{J} c_j \|L_j * K - B_j\|_p^p + \omega_2 \sum_{j=1}^{J} c_j \big(\|D_x * L_j * K - D_x * B_j\|_p^p + \|D_y * L_j * K - D_y * B_j\|_p^p\big) + \gamma_1 \|K\|_q^q + \gamma_2 \big(\|D_x * K\|_q^q + \|D_y * K\|_q^q\big). \quad \text{Equation (7)}$$

In Equation (7), and elsewhere in this document, (i) $\omega_1$ is a fidelity weight for the first fidelity term, (ii) $\omega_2$ is a fidelity weight for the second fidelity term, (iii) $\gamma_1$ is a regularization weight for the first regularization term, (iv) $\gamma_2$ is a regularization weight for the second regularization term, and (v) $c_j$ are individual block weights based on an estimated block "quality" of the area blocks 494. For example, with the test chart 14 of FIG. 2A, when each area blocks 494 is one of the tile images 362, each of the area blocks 494 will have the same quality. In this example, $c_j$ can be removed from Equation(s) or $c_j$ can be equal to one ($c_j$=1).

As a non-exclusive example, if a 2-norm is used in the fidelity term(s) (p=2) and regularization term(s) (q=2) of Equation (7), then a non-exclusive example of a closed form formula for the cost function of Equation (7) minimum is as follows:

$$F(K) \approx \frac{(\omega_1 + \omega_2 G) \sum_{j=1}^{J} c_j \overline{F(L_j)} F(B_j)}{(\omega_1 + \omega_2 G) \sum_{j=1}^{J} c_j \overline{F(L_j)} F(L_j) + (\gamma_1 + \gamma_2 G)}. \quad \text{Equation (8)}$$

In Equation 8, the term $G = \overline{F(D_x)}F(D_x) + \overline{F(D_y)}F(D_y)$.

It should be noted that other closed form formulas can be used for Equation (7). For example, when post-processed latent sharp image derivatives are used for estimating PSF, the derivative operator (factor $\omega_1 + \omega_2 G$) cannot be factored out and the formula is different.

Additionally, it should be noted that other significant modifications are possible to PSF cost function of Equation (7), such as (i) assuming a Laplacian prior (this results in regularization terms with a power ((q=1)); (ii) assuming a hyper-Laplacian prior (this results in regularization terms with a power of less than one ((q<1)); and/or (iii) using a spatial mask in either the regularization or fidelity term(s) (or in both). Such cost functions do not have a closed form formula for their minimum, but can be minimized by various iterative numerical methods. One non-exclusive method uses a variable splitting algorithm. One non-exclusive example of a variable splitting algorithm is disclosed in PCT/US13/30227 filed on Mar. 11, 2013 and PCT/US13/30252 filed on Mar. 11, 2013. As far as permitted, the contents of PCT/US13/30227 and PCT/US13/30252 are incorporated herein by reference. Another non-exclusive example of a variable splitting technique is described in the paper by Sroubek and Milanfar (F. Sroubek, P. Milanfar: *Robust Multichannel Blind Deconvolution via Fast Alternating Minimization*, IEEE Trans Im. Proc., 2012), the contents of which are incorporated herein by reference).

As another example, a PSF cost function having features of the present invention can be expressed in a more general form as provided below:

$$c(K) = \quad \text{Equation (9)}$$

$$\omega_0 \sum_{j=1}^{J} \|L_j * K - B_j\|_p^p + \omega_1 \sum_{j=1}^{J} \|D_x * L_j * K - D_x * B_j\|_p^p +$$

$$\omega_2 \sum_{j=1}^{J} \|D_y * L_j * K - D_y * B_j\|_p^p +$$

-continued $$\omega_{11} \sum_{j=1}^{J} \|D_{xx} * L_j * K - D_{xx} * B_j\|_p^p +$$

$$\omega_{12} \sum_{j=1}^{J} \|D_{xy} * L_j * K - D_{xy} * B_j\|_p^p +$$

$$\omega_{22} \sum_{j=1}^{J} \|D_{yy} * L_j * K - D_{yy} * B_j\|_p^p +$$

RegularizationTerm(s).

In Equation (9) and elsewhere (i) $\omega_0$, $\omega_1$, $\omega_2$, $\omega_{11}$, $\omega_{12}$, and $\omega_{22}$ are the fidelity weights for the respective fidelity terms; (ii) $D_x$ and $D_y$ are the first order partial derivative operators; (iii) $D_{xx}$, $D_{yy}$, and $D_{xy}$ are the second order partial derivative operators; and (iv) the subscript p denotes the norm for the fidelity term(s), and (v) the superscript p denotes the power for the fidelity term(s).

The exact regularization term(s) utilized in Equation (9) can vary. In one non-exclusive embodiment, the regularization term(s) can be expressed as follows:

$$\gamma_1 \|K\|_q^q + \gamma_2(\|D_x * K\|_q^q + \|D_y * K\|_q^q) \qquad \text{Equation (10)}.$$

Thus, RegularizationTerm(s)=$\gamma_1 \|K\|_q^q + \gamma_2(\|D_x * K\|_q^q + \|D_y * K\|_q^q)$. In Equation (10) and elsewhere, the gamma 1 and gamma 2 ($\gamma_1$ and $\gamma_2$) are regularization term weights. It should be noted that the fidelity term weights ($\omega$-omega) and the regularization term weights ($\gamma$-gamma) can be chosen to be zero ("0") or another weight. As a result thereof, in Equation (9), this PSF cost function covers cases both with and without derivatives. In one embodiment, the PSF cost function can be assumed to have a Gaussian prior (q=2) to allow for a closed form formula for the minimum. Alternatively, the PSF cost function can (i) assume a Laplacian prior (this results in regularization terms with a norm of one ((q=1)); or (ii) assuming a hyper-Laplacian prior (this results in regularization terms with a norm of less than one ((q<1)).

For the example, if a 2-norm is used in the fidelity term(s) (p=2) and regularization term(s) (q=2) of Equation (9), then a non-exclusive example of a closed form formula for the cost function of Equation (9) minimum is as follows:

$$F(K) = \frac{Term1 \sum_{j=1}^{J} \overline{F(L_j)} F(B_j)}{Term1 \sum_{j=1}^{J} \overline{F(L_j)} F(L_j) + Term2}. \qquad \text{Equation (11)}$$

In Equation (11), the value of Term1 will depend on the fidelity term(s) used, and value of Term2 will depend upon the regularization term(s) used in Equation (9). It should be noted that the closed form formula of Equation (11) includes (i) $\Sigma_{j=1}^{J} \overline{F(L_j)} F(B_j)$ in the numerator, and (ii) $\Sigma_{j=1}^{J} \overline{F(L_j)} F(L_j)$ in the denominator; where F is a Fourier transform. The numerator term $\Sigma_{j=1}^{J} \overline{F(L_j)} F(B_j)$ can be described as (i) the sum over j of the products of the complex conjugate of the Fourier transform of the latent sharp image number j and the Fourier transform of the blurry image number j, or (ii) the sum over j of the Fourier transforms of the cross-correlations between the latent sharp image number j and blurry image number j. Further, the denominator term $\Sigma_{j=1}^{J} \overline{F(L_j)} F(L_j)$ can be described as the sum of the power spectra of the latent sharp images (blocks).

Somewhat similarly, if other than a 2-norm is used in the fidelity term(s) (p≠2) and regularization term(s) (q≠2) of Equation (9), then an iterative algorithm can be used for minimizing the cost function (like the one resulting from variable splitting). Equation (11.1) can be used when the power p is not equal to two (2), and the cost function is minimized by variable splitting, as such formula needs to be evaluated in each iteration. The algorithm may include as one of the steps the evaluation of a closed form formula as provided in Equation (11.1) as follows:

$$F(K) = \frac{Term1 \sum_{j=1}^{J} \overline{F(L_j)} F(A_j)}{Term1 \sum_{j=1}^{J} \overline{F(L_j)} F(L_j) + Term2}. \qquad \text{Equation (11.1)}$$

In Equation (11.1), the value of Term1 will again depend on the fidelity term(s) used, and value of Term2 will again depend upon the regularization term(s) used in Equation (9). It should be noted that the closed form formula of Equation (11.1) includes (i) $\Sigma_{j=1}^{J} \overline{F(L_j)} F(A_j)$ in the numerator, and (ii) $\Sigma_{j=1}^{J} \overline{F(L_j)} F(A_j)$ in the denominator; where F is a Fourier Transform. Further, Equation (11.1) is similar to Equation (11), except with Aj is used instead of Bj (the blurry image at area block j) one or more times. As used herein, $A_j$ is a modified image at block j that can be computed using (i) the blurry image at block j ($B_j$), or (ii) a combination of the blurry image at block j ($B_j$) and the latent sharp image at area block j ($L_j$). As a non-exclusive example, if p=1 (Laplacian prior fidelity term), then Aj can be either the result of soft thresholding applied to the blurry image Bj (altered version of Bj), or it can be the result of soft thresholding applied to the residuum Bj−K*Lj, depending on the choice of the auxiliary variable in the variable splitting algorithm.

For Equation (11.1), the numerator term $\Sigma_{j=1}^{J} \overline{F(L_j)} F(A_j)$ can be described as (i) the sum over j of the products of the complex conjugate of the Fourier transform of the latent sharp image number j and the Fourier transform of the modified image number j, or (ii) the sum over j of the Fourier transforms of the cross-correlations between the latent sharp image number j and modified image number j. Further, the denominator term $\Sigma_{j=1}^{J} \overline{F(L_j)} F(L_j)$ can be described as the sum of the power spectra of the latent sharp images (blocks).

In one embodiment, if the regularization terms of Equation (10) are used in Equation (9), Term1 and Term2 can be expressed as follows:

Term1=$\omega_0 + \omega_1 \overline{F(D_x)} F(D_x) + \omega_2 \overline{F(D_y)} F(D_y) + \omega_{11}$
$\overline{F(D_{xx})} F(D_{xx}) + \omega_{12} \overline{F(D_{xy})} F(D_{xy}) + \omega_{22}$
$\overline{F(D_{yy})} F(D_{yy})$ \qquad Equation (12)

Term2=$\gamma_1 + \gamma_2(\overline{F(D_x)} F(D_x) + \overline{F(D_y)} F(D_y))$. \qquad Equation (13)

It should be noted that other equivalent equations can be used for Term1 and/or Term2 depending upon the regularization term utilized. Further, the equation for Term2 can be arbitrary.

It also should be noted that other closed form formulas can be used for Equation (9). For example, when post-processed latent sharp image derivatives are used for estimating PSF, the derivative operator Term1 cannot be factored out and the formula is different.

It should also be noted that other types of regularization term(s) can be utilized in the PSF cost functions provided herein. As non-exclusive examples, the regularization term(s) can include one or more of the terms (i) $\|K\|_q^q$ with any q (q=2, q=1, q<1); (ii) $\|D_\alpha * K\|_q^q$ with any q (q=2, q=1, q<1) and any direction of derivative $\alpha$; (iii) $\|D*K\|_q^q$ with any q (q=2, q=1, q<1) and any regularization operator D (e.g. Laplacian, but it could represent also a derivative of order higher than 1); and/or (iv) $\||\mathrm{grad}(K)|\|_q^q$ with any q (q=2, q=1, q<1) where $|\mathrm{grad}(K)|$ denotes the magnitude of the gradient of K.

Additionally, it should be noted that Equation (9) can be modified to include individual weights $c_j$ for the area blocks as follows:

$$c(K) = \omega_0 \sum_{j=1}^{J} c_j \|L_j * K - B_j\|_p^p + \quad \text{Equation (14)}$$

$$\omega_1 \sum_{j=1}^{J} c_j \|D_x * L_j * K - D_x * B_j\|_p^p +$$

-continued $$\omega_2 \sum_{j=1}^{J} c_j \|D_y * L_j * K - D_y * B_j\|_p^p +$$

$$\omega_{11} \sum_{j=1}^{J} c_j \|D_{xx} * L_j * K - D_{xx} * B_j\|_p^p +$$

$$\omega_{12} \sum_{j=1}^{J} c_j \|D_{xy} * L_j * K - D_{xy} * B_j\|_p^p +$$

$$\omega_{22} \sum_{j=1}^{J} c_j \|D_{yy} * L_j * K - D_{yy} * B_j\|_p^p +$$

RegularizationTerm_(s).

However, when each area blocks 494 is one of the tile images 362, each of the area blocks 494 will have relatively good quality and $c_j$ can be equal to one ($c_j$=1).

As yet another non-exclusive example, a PSF cost function having features of the present invention can be expressed in a more general form as provided below:

$$c(K) = \omega \sum_{j=1}^{J} c_j \|B_j - K * L_j\|_p^p + \quad \text{Equation (15)}$$

$$\sum_{j=1}^{J} c_j \left( \|B_{j,x} - K * L_{j,x}\|_p^p + \|B_{j,y} - K * L_{j,y}\|_p^p \right) +$$

$$\gamma_1 \|K - K_{prev}\|_q^q + \gamma_2 \left( \|D_x * K\|_q^q + \|D_y * K\|_q^q \right).$$

In Equation (15), and elsewhere in this document, (i) K is the PSF kernel to be estimated, (ii) $K_{prev}$ is the postprocessed PSF kernel from a previous iteration, (iii) $L_j$, $L_{j,x}$, $L_{j,y}$ are the jth latent sharp image and its derivatives with respect to x and y, (iv) $B_j$, $B_{j,x}$, $B_{j,y}$ are the jth blurry image and its derivatives with respect to x and y, (v) $D_x$, $D_y$ are convolution kernels for derivatives with respect to x and y, (vi) $\omega$ is a general fidelity weight for the first fidelity term, (vii) $C_j$ are individual block weights, and (viii) $\gamma_1$ is a regularization weight for the first regularization term, (ix) $\gamma_2$ is a regularization weight for the second regularization term, (x) the subscript p denotes the norm for the fidelity term(s), (xi) the superscript p denotes the power for the fidelity term(s), (xii) the subscript q denotes the norm for the regularization term(s), and (xiii) the superscript q denotes the power for the regularization term(s). As provided above, p and q can have a value of 2, 1 or less than 1. It should be noted that $L_j$, $L_{j,x}$, $L_{j,y}$ can possibly be postprocessed.

For the example, if a 2-norm is used in the fidelity term(s) (p=2) and regularization term(s) (q=2) of Equation (15), then a non-exclusive example of a closed form formula for the cost function of Equation (15) minimum is as follows:

$$F(K) = \frac{\left( \sum_{j=1}^{J} c_j (\omega \overline{F(L_j)} F(B_j) + \overline{F(L_{j,x})} F(B_{j,x}) + \overline{F(L_{j,y})} F(B_{j,y}) ) + \gamma_1 F(K_{prev}) \right)}{\left( \sum_{j=1}^{J} c_j (\omega \overline{F(L_j)} F(L_j) + \overline{F(L_{j,x})} F(L_{j,x}) + \overline{F(L_{j,y})} F(L_{j,y}) ) + (\gamma_1 + \gamma_2 Z) \right)}. \quad \text{Equation (16)}$$

In Equation 16, $Z = |F(D_x)|_2^2 + |F(D_y)|_2^2$.

It should be noted that other closed form formulas can be used for Equation (15).

As provided herein, the algorithms used for solving the non-blind deconvolution problem are used to estimate a separate, local area optics point spread function 518 for each image area 490, for each color.

Figure 5A:
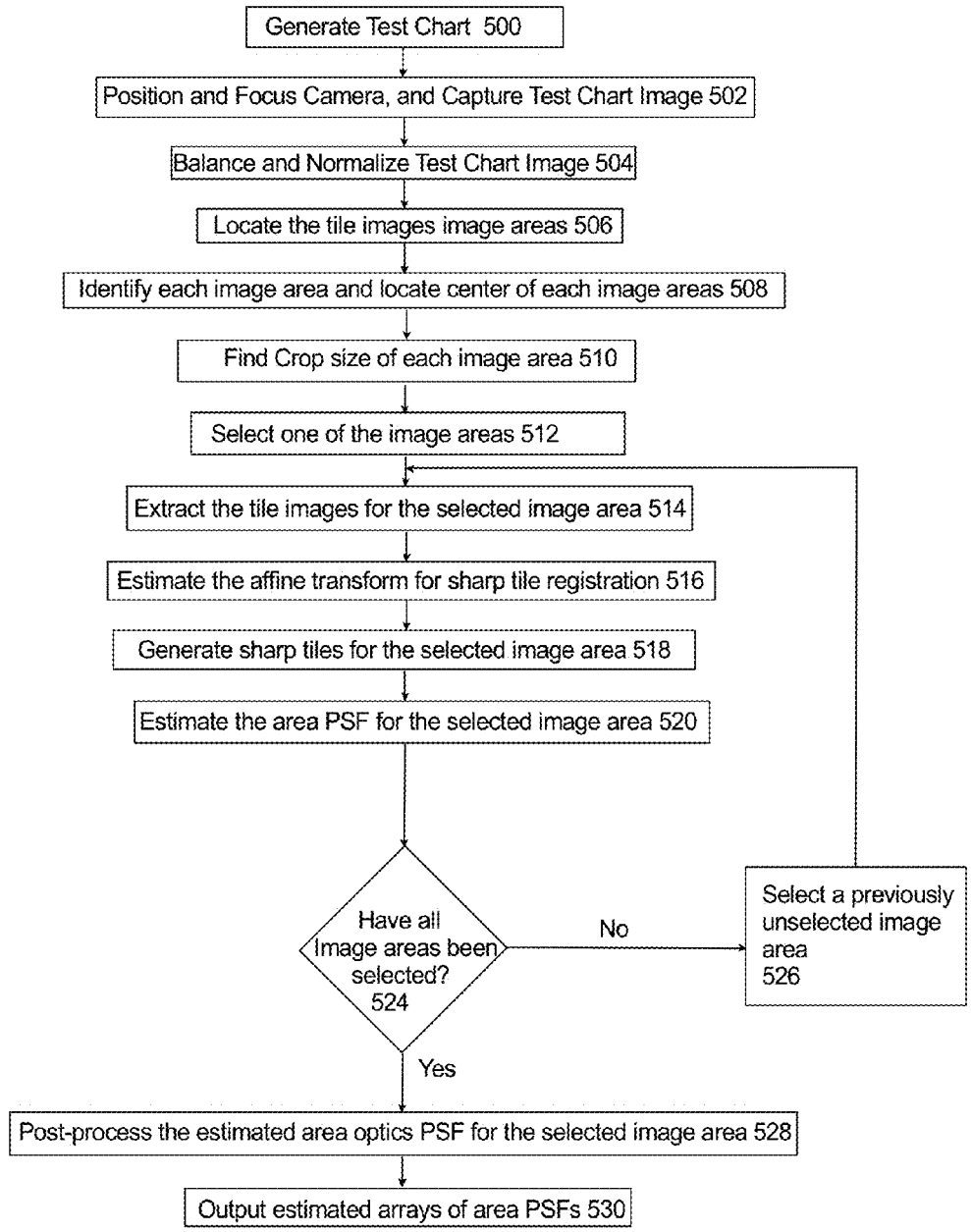
FIG. 5A is a flow chart that illustrates one non-exclusive method for calculating the optics point spread functions.

FIG. 5A is a flow chart that illustrates one non-exclusive method for calculating the separate area optics point spread functions 518 for a lens assembly 20. It should be noted that one or more of these steps can be performed by the camera 10 and/or the computer 12. For example, the test chart image can be captured with the camera, and the subsequent steps can be performed by the computer 12 to estimate the optics point spread functions 518 for a lens assembly 20. Further, one or more of the steps in FIG. 5A can be optional.

In this embodiment, at block 500, the test chart 14 is generated. A discussion of the features of a suitable test chart 14 is described above in reference to FIG. 2A and 2B. In one embodiment, the test chart 14 includes multiple tile sets 246 with each tile set 246 including four different, high resolution, tiles 250A, 252A, 254A, 256A.

Additionally, the test chart 14 is accessible by the control system 24, 26 as the latent sharp image for estimating the respective point spread function.

Next, at block 502, the camera 10 is properly positioned and focused on the test chart 14, and the camera 10 is used to capture the test chart image 316 that includes the plurality of tile images 380A, 382A, 384A, 386A as a result of the tiles 250A, 252A, 254A, 256A in the test chart 14.

Subsequently, at block 504, the test chart image 316 is balanced and normalized by one of the control systems 24, 26. For example, an average value can be made equal for all color channels and the brightest area in the center of test chart image 316 can be used to normalize the white point to one. In one embodiment, this step is simplified if the test chart 14 is in black and white.

Next, at block 506, the tile images 380A, 382A, 384A, 386A are identified and located by one of the control systems 24, 26. As a non-exclusive example, an interpolated green channel can be created. Subsequently, the white image dividers 368, 370 separating the tile images 362 can be segmented out by (i) thresholding the test chart image 316 to convert to a binary image, and (ii) using the brightest area near the center as a seed. Next, the rough positions of the centers of the tile images 380A, 382A, 384A, 386A can be identified by analyzing the horizontal and vertical image dividers 368, 370 of the segmented separating white grid. Subsequently, the positions of the centers of the tile images 380A, 382A, 384A, 386A can be refined by (i) segmenting out each individual tile image 380A, 382A, 384A, 386A in the segmented separating grid; (ii) using the rough center position as a seed for segmentation; and (iii) computing the centroid of the segmented tile image 380A, 382A, 384A, 386A.

Figure 5B:
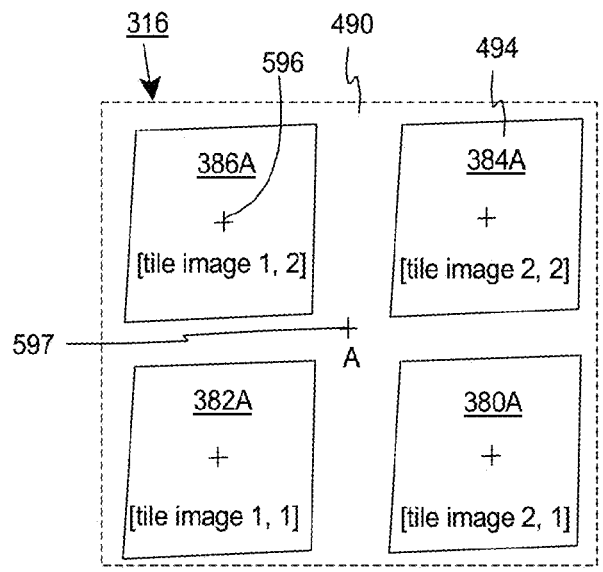
FIG. 5B is a simplified illustration of an image area of the test chart image of FIG. 3A.

FIG. 5B illustrates the simplified image area 490 labeled as "A" from the lower left corner of the tile chart image 316. In this example, the image area 490 includes the first tile image 380A [tile image 2, 1], the second tile image 382A [tile image 1, 1], the third tile image 384A [tile image 2, 2], and the fourth tile image 386A [tile image 1, 2] from the lower left corner of the tile chart image 316. The tile image center 596 of each the tile images 380A, 382A, 384A, 386A in FIG. 5B is shown with a "+" symbol.

Next, at block 508, an image area center 597 of each image area 490 is located. The image area centers 597 are the place where each local area point spread functions 518 will be centered. For example, the image area center 597 of each image area 490 can be located by averaging the tile image center 596 of the four neighboring tile images 380A, 382A, 384A, 386A. FIG. 5B illustrates the image area center 597 (with a "+" symbol) for the image area 490 labeled A.

Referring back to FIG. 5A, subsequently, at block 510, the size of the four tile images 380A, 382A, 384A, 386A are cropped for each image area 490. More specifically, due to geometric distortion, the captured tile images 380A, 382A, 384A, 386A are distorted (roughly a parallelogram). In certain embodiments, these distorted, captured tile images 380A, 382A, 384A, 386A will need to be cropped a rectangular (or square) area that is completely within this distorted region (the cropped out rectangle should not contain any white divider pieces).

As a non-exclusive example, the biggest square fitting between the four neighboring tile image centers 590, use known tile/gap size ratio, and reduce by a few pixels to guarantee only inside of each tile will be cropped out.

Next, at block 512, one of the image areas 490 is selected for estimation of its corresponding area point spread function 518. For example, image area "A" illustrated in FIG. 5B can be selected.

In this example, as provided above, the image area 490"A" includes four neighboring, different tile images 380A, 382A, 384A, 386A, and each of the four different tile images 380A, 382A, 384A, 386A can be used in the estimation of the area point spread function 518 for the image area 490 labeled "A". Alternatively, less than four of the tile images 380A, 382A, 384A, 386A (area blocks) can be used in the estimation of the area point spread function 518 for image area 490 labeled "A". Not using all area tile images 380A, 382A, 384A, 386A reduces the amount of data that is processed and makes computations faster. However, accuracy can be decreased.

Subsequently, at block 514, for the selected image area 490, the four neighboring, different tile images 380A, 382A, 384A, 386A are separated and extracted into the four different area blocks 494.

Next, at block 516, an affine transform can be estimated for the sharp tile registration.

As provided herein, the tile set 246 of the test chart 14 that was captured in the selected image area 490 can be used as the latent sharp image during minimization of the PSF cost function. Thus, when the selected image area 490 is the one in the lower left corner of the test chart image 316, the corresponding tile set 246 is in the lower left corner of the test chart 14.

Figure 5C:
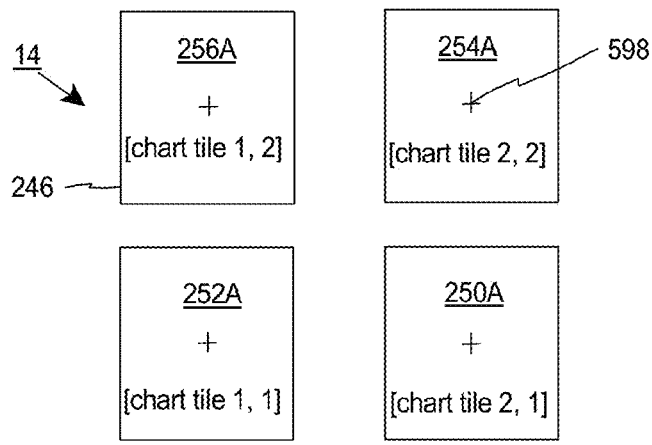
FIG. 5C is a simplified illustration of a tile set from the test chart of FIG. 2A.

FIG. 5C illustrates the high resolution tile set 246 from the lower left corner of the test chart 14, and includes the first tile 250A [chart tile 2, 1], the second tile 252A [chart tile 1, 1], the third tile 254A [chart tile 2, 2], and the fourth tile 256A [chart tile 1, 2]. The tile center 598 of each the chart tiles 250A, 252A, 254A, 256A in FIG. 5C is shown with a "+" symbol.

With reference to FIGS. 5B and 5C, the tile images 380A, 382A, 384A, 386A are geometrically distorted when compared to the chart tiles 250A, 252A, 254A, 256A.

In one embodiment, to compensate for the geometric distortion, the chart tiles 250A, 252A, 254A, 256A are artificially geometrically distorted to match the geometric distortion of the tile images 380A, 382A, 384A, 386A.

For example, the four neighboring tile image centers 596 of the test chart image 316 can be compared to the corresponding four neighboring tile centers 598 of the test chart 14 to find the coefficients of the transform.

Figure 5D:
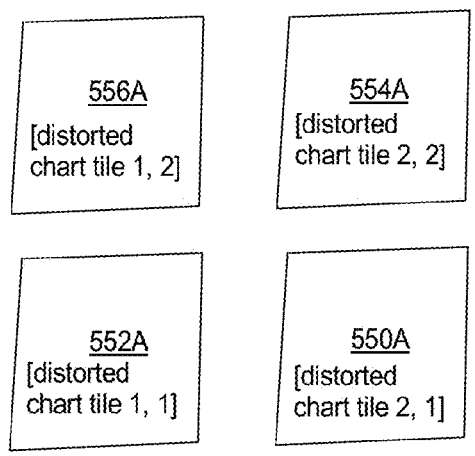
FIG. 5D is a simplified illustration of an altered tile set.

Subsequently, the sharp tiles 250A, 252A, 254A, 256A that correspond to the selected image area are generated. This can include resampling the high resolution sharp tile template using a grid distorted by estimated affine transform. More specifically, with reference to FIGS. 5B-5D, (i) the first tile 250A is geometrically distorted to match the distortion of the first tile image 380A to create an artificially distorted (altered) first tile 550A; (ii) the second tile 252A is geometrically distorted to match the distortion of the second tile image 382A to create an artificially distorted (altered) second tile 552A; (iii) the third tile 254A is geometrically distorted to match the distortion of the third tile image 384A to create an artificially distorted (altered) third tile 554; and (iv) the fourth tile 256A is geometrically distorted to match the distortion of the fourth tile image 386A to create an artificially distorted (altered) fourth tile 556A.

With this design, the distorted first tile 550A, the distorted second tile 552A, the distorted third tile 554A, and the distorted fourth tile 556A are used in the PSF cost function during minimization for the selected image area 490 as respective latent sharp image for each tile images 380A, 382A, 384A, 386A.

Referring back to FIG. 5A, next, at block 520, the area point spread function 518 is calculated for the selected image area 490 using one of the PSF cost functions provided above using the tile images 380A, 382A, 384A, 386A and the tiles 550A, 552A, 554A, 556A simultaneously.

In one embodiment, for each image area 490, a separate red channel, green channel, and blue green array of area optics point spread functions is estimated. Alternatively, all of the colors can be handled simultaneously, or another color model can be used.

Optics blur PSFs are wavelength dependent. Thus, for restoring images, the separate red, blue, and green arrays of area point spread functions are typically used.

Figure 5E:
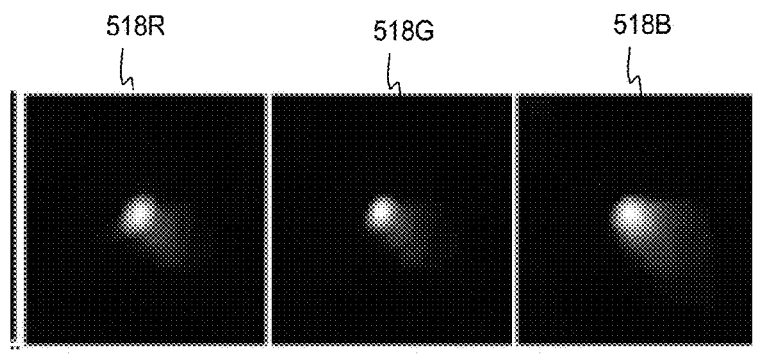
FIG. 5E is a simplified illustration of three area point spread functions for the image area of FIG. 5B.

FIG. 5E is a simplified illustration of a red channel area optics point spread function 518R, a green channel area optics point spread function 518G, and a blue channel area optics point spread function 518B calculated for the selected image area 490 using one of the PSF cost functions provided above using the tile images 380A, 382A, 384A, 386A and the tiles 550A, 552A, 554A, 556A simultaneously.

Next, at block 524, the image areas 490 are reviewed to determine if a separate area point spread function 518 has been calculated for each image area 490. If no, at block 526, a previously unselected image area 490 is selected and blocks 514-524 are repeated until a separate, area point spread function 518 has been calculated for each of the desired image areas 490.

Figure 5F:
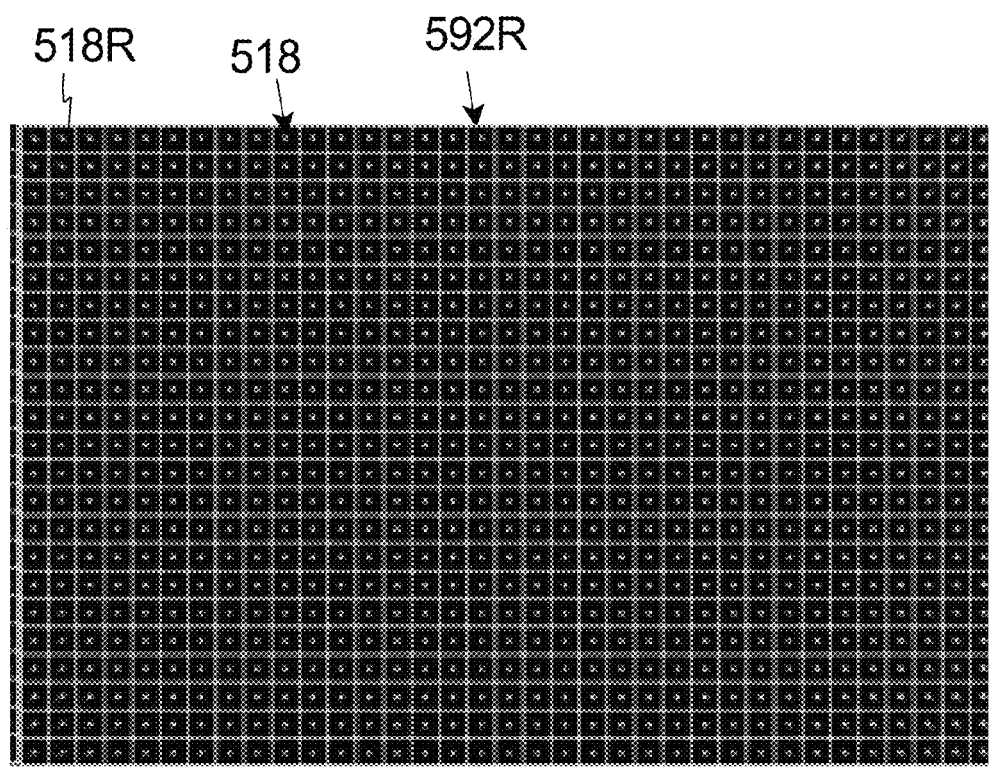
FIG. 5F is a simplified illustration of a plurality of red channel, area point spread functions.
Figure 5G:
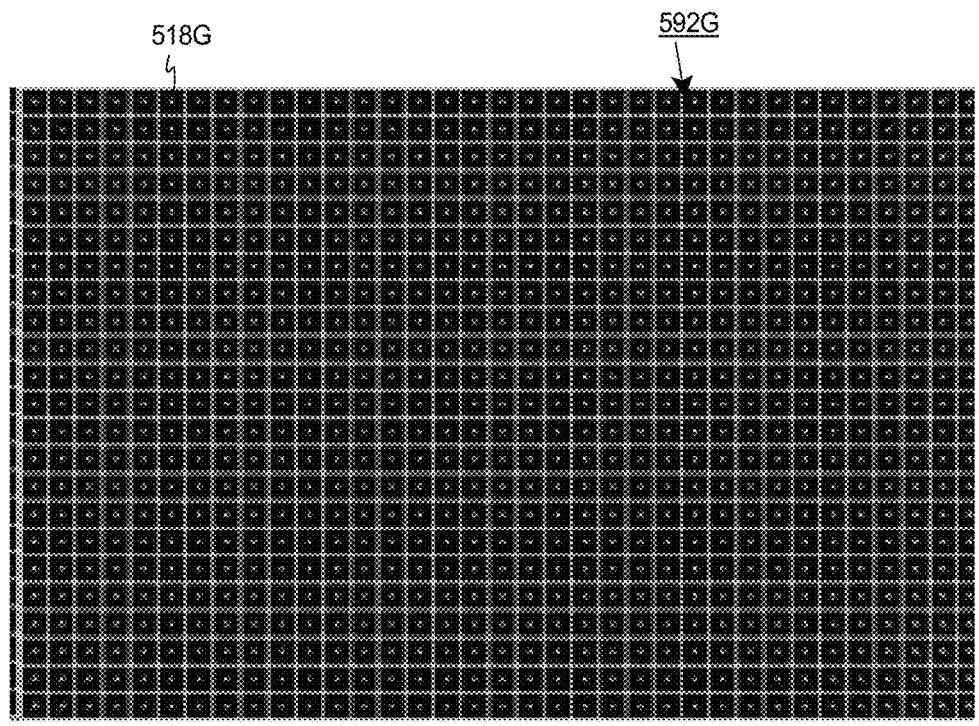
FIG. 5G is a simplified illustration of a plurality of green channel, area point spread functions.
Figure 5H:
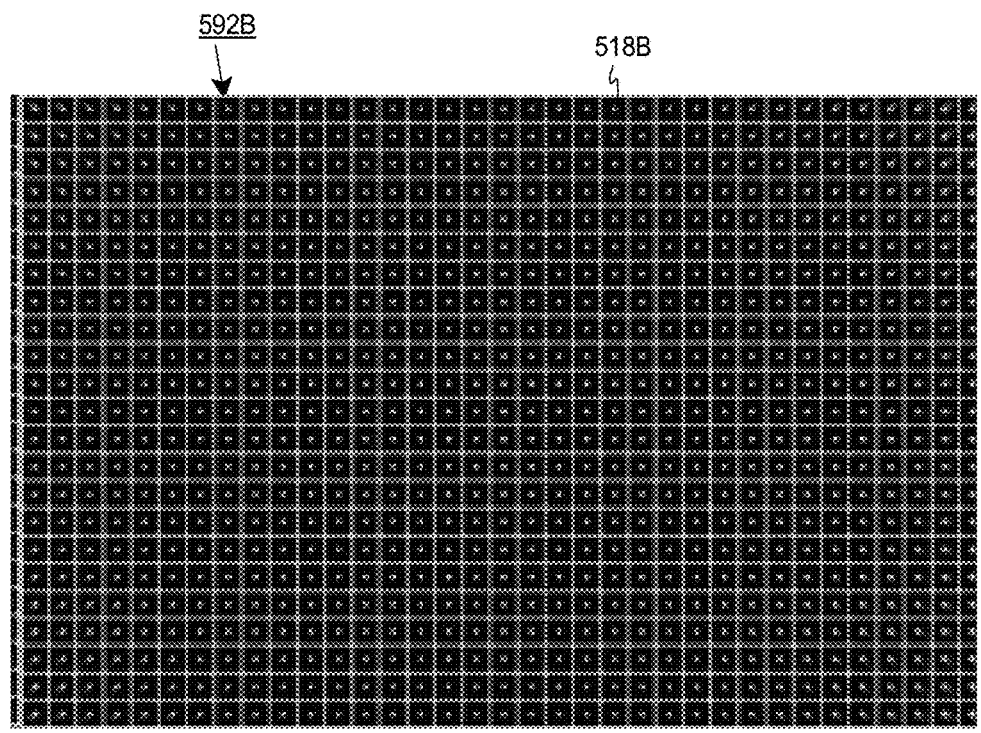
FIG. 5H is a simplified illustration of a plurality of blue channel, area point spread functions.

FIG. 5F is a simplified illustration of the separate, red channel array 592R of area point spread functions 518R that is estimated for the image areas 490. Similarly, FIG. 5G is a simplified illustration of the separate, green channel array 592G of area point spread functions 518G that is estimated at each of the image areas 490. Further, FIG. 5H is a simplified illustration of the separate, blue channel array 592B of area point spread functions 518B that is estimated at each of the image areas 490. It should be noted that the channel arrays 592R, 592G, 592B collectively can be referred to a set of arrays.

In this example, a separate red channel array 592R, green channel array 592G, and blue channel array 592B is calculated for each of the image area 490 in the test chart image 316. Further, in this example, each separate channel array 592R, 592G, 592B includes eight hundred and five, estimated, separate, local area optics point spread functions 518R, 518G, 518B that are organized in the twenty-three by thirty-five array. It should be noted that any of these area optics point spread functions 518R, 518G, 518B can be referred to as a first, second, third, fourth, etc. area optics point spread function 518. Alternatively, the separate area point spread functions 518R, 518G, 518B can be calculated for only a predetermined number (less than all) of image areas 490 in the test chart image 316.

As provided above, blur caused by lens aberrations depend on field position, i.e., it is spatially variant. The present invention approximates the blur using the plurality of spatially variant, area optics point spread functions 518.

When the answer to block 524 is yes, at block 528, the estimated area optics point spread functions 518R, 518G, 518B for all of the image areas 490 are post processed. As non-exclusive examples, the processing in block 528 can include reducing noise by thresholding and keeping one connected component, including combining PSFs for locations with the same distance from the center (rotated versions of), to create new more accurate local PSFs for all those locations.

For example, an ideal lens assembly 20 (with no decentering due to manufacturing imperfections) is rotationally symmetric. As a result thereof, the area optics PSFs will be symmetric and the area optics PSFs for locations at the same distance from the image center will be rotated copies of each other. This can be used in the post-processing step for reducing the noise in the estimated optics blur PSFs (e.g. take two such PSFs, rotate them so that they have the same orientation, average them, and then create new local PSFs by rotating the average to match the original orientation of each originally estimated PSF).

Next, at block 530, the estimated red channel array 592R, green channel array 592G, and blue channel array 592B are outputted. For example, all of the estimated area point spread functions 518 can be combined to a single five dimensional array and PSF estimate locations It should be noted that other tile sets 246 with other types of chart tiles 232 are possible. For example, more non-exclusive examples of possible tiles sets and chart tiles are illustrated in FIGS. 6-24. Many other variations are possible.

Figure 6:
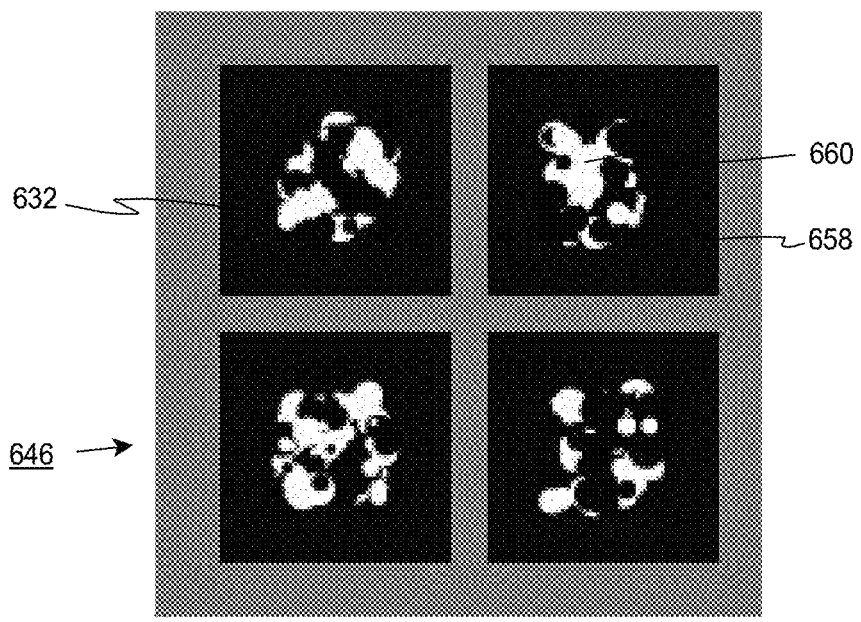
FIG. 6 is a front plan view of another embodiment of a tile set for a test chart.

More specifically, FIG. 6 is a front plan view of another embodiment of a tile set 646 that includes four different chart tiles 632. In this embodiment, the features 660 are random white blobs on a black background 658.

Figure 7:
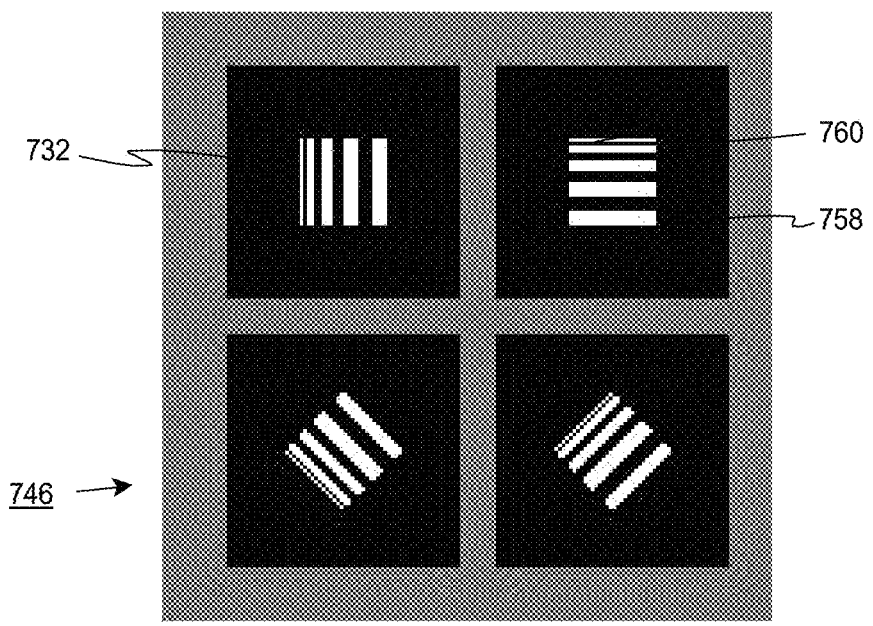
FIG. 7 is a front plan view of yet another embodiment of a tile set for a test chart.

FIG. 7 is a front plan view of another embodiment of a tile set 746 that includes four different chart tiles 732. In this embodiment, the features 760 are spaced apart white lines on a black background 758.

Figure 8:
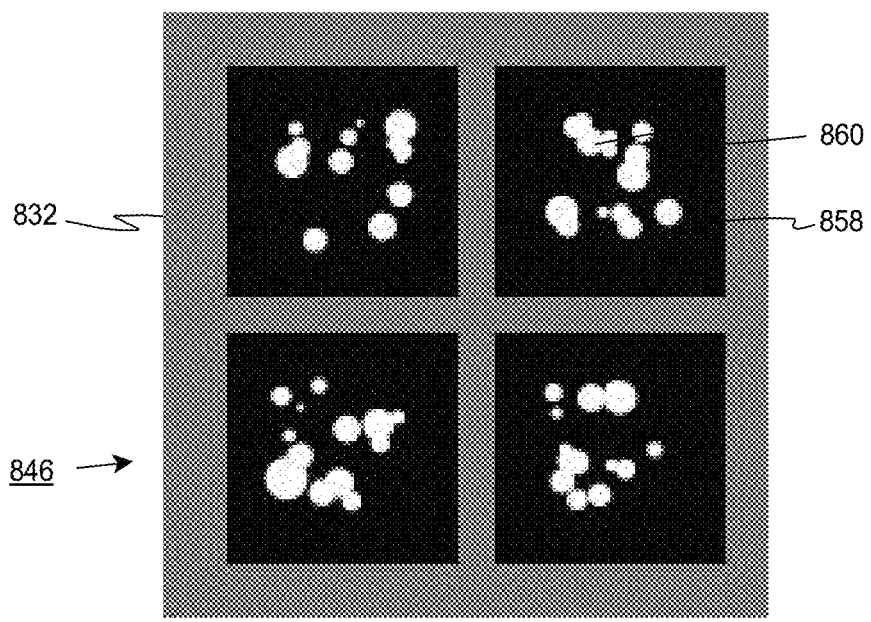
FIG. 8 is a front plan view of still another embodiment of a tile set for a test chart.

FIG. 8 is a front plan view of another embodiment of a tile set 846 that includes four different chart tiles 832. In this embodiment, the features 860 are random white circles on a black background 858.

Figure 9:
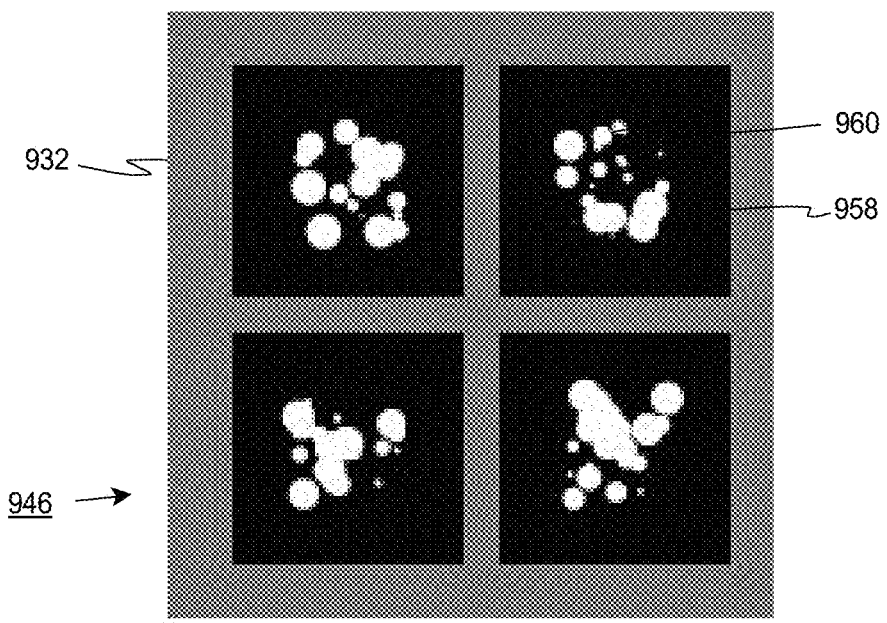
FIG. 9 is a front plan view of another embodiment of a tile set for a test chart.

FIG. 9 is a front plan view of another embodiment of a tile set 946 that includes four different chart tiles 932. In this embodiment, the features 960 again include random white circles on a black background 958.

Figure 10:
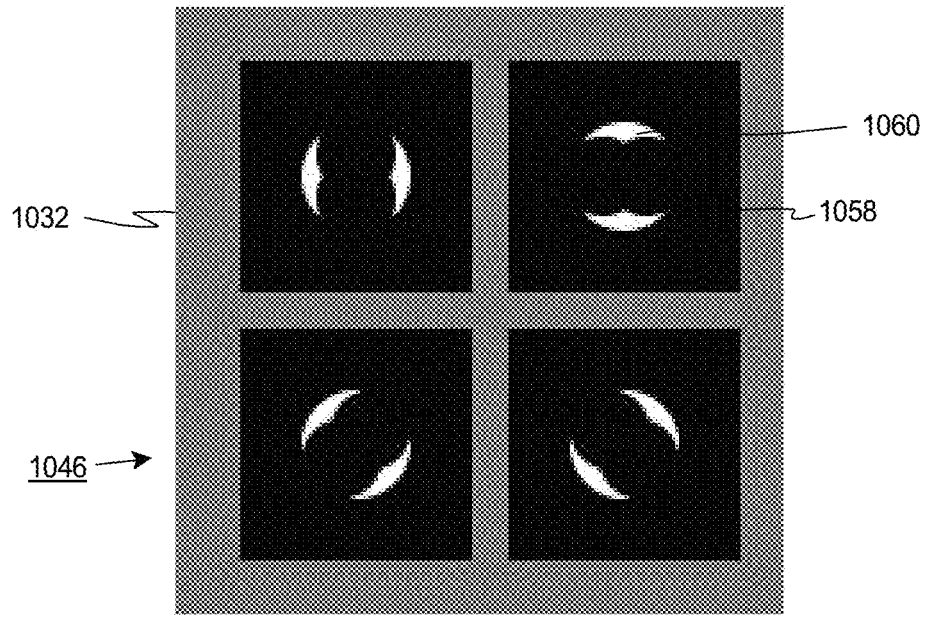
FIG. 10 is a front plan view of yet another embodiment of a tile set for a test chart.

FIG. 10 is a front plan view of another embodiment of a tile set 1046 that includes four different chart tiles 1032. In this embodiment, the features 1060 are spaced apart white arches on a black background 1058.

Figure 11:
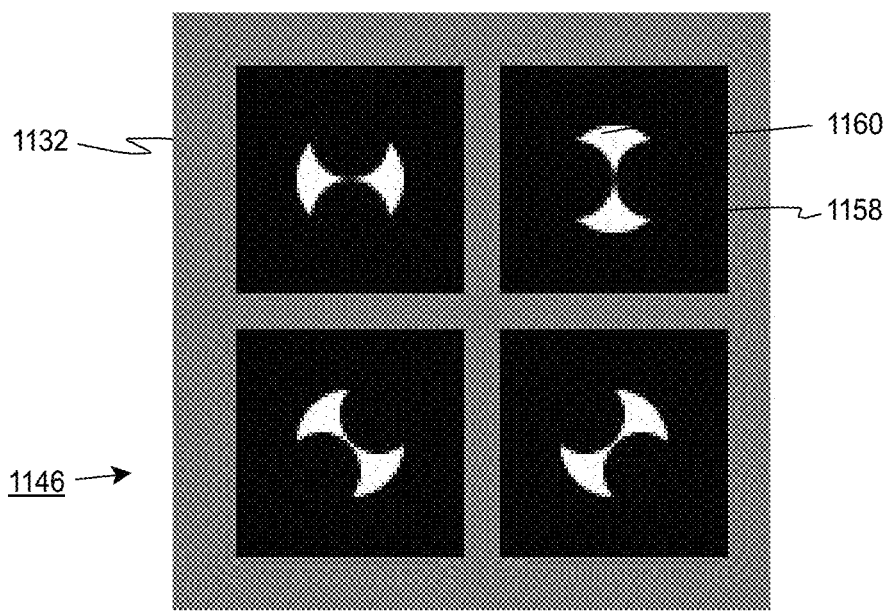
FIG. 11 is a front plan view of still another embodiment of a tile set for a test chart.

FIG. 11 is a front plan view of another embodiment of a tile set 1146 that includes four different chart tiles 1132. In this embodiment, the features 1160 are shaped somewhat similar to a hourglass and are white on a black background 1158.

Figure 12:
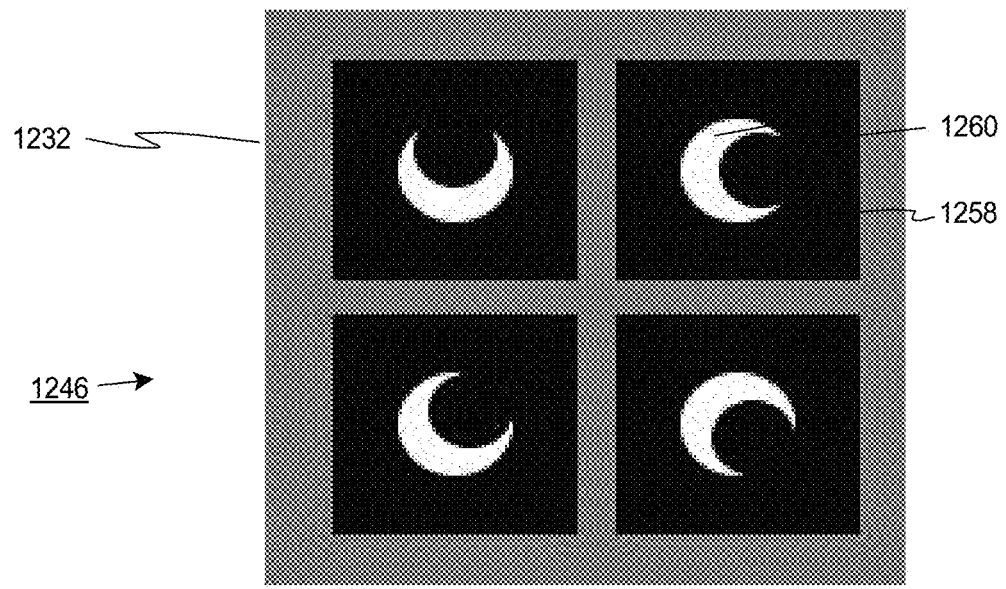
FIG. 12 is a front plan view of another embodiment of a tile set for a test chart.

FIG. 12 is a front plan view of another embodiment of a tile set 1246 that includes four different chart tiles 1232. In this embodiment, the features 1260 are shaped somewhat similar to a crescent moon, and are white, on a black background 1258.

Figure 13:
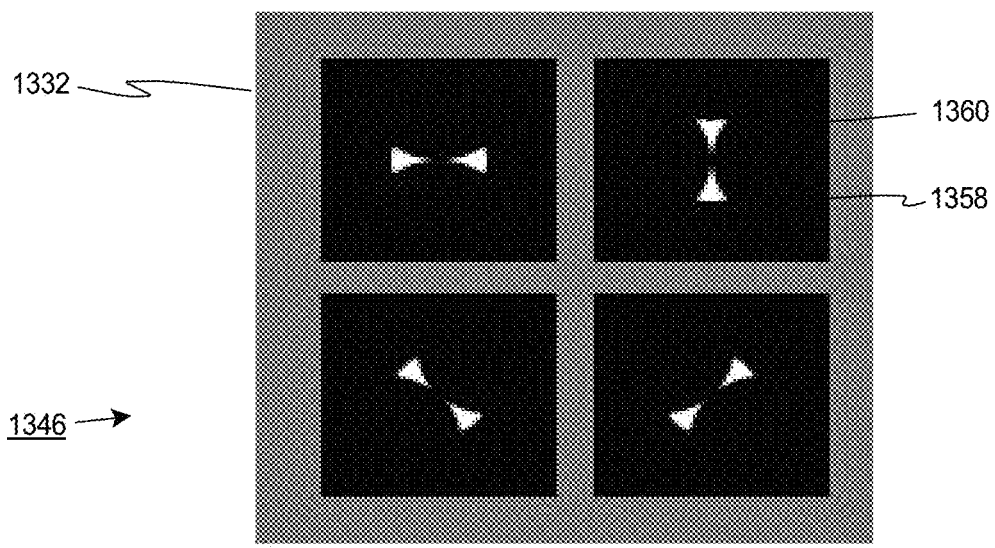
FIG. 13 is a front plan view of yet another embodiment of a tile set for a test chart.

FIG. 13 is a front plan view of another embodiment of a tile set 1346 that includes four different chart tiles 1332. In this embodiment, the features 1360 are shaped somewhat similar to a bow tie, and are white on a black background 1358.

Figure 14:
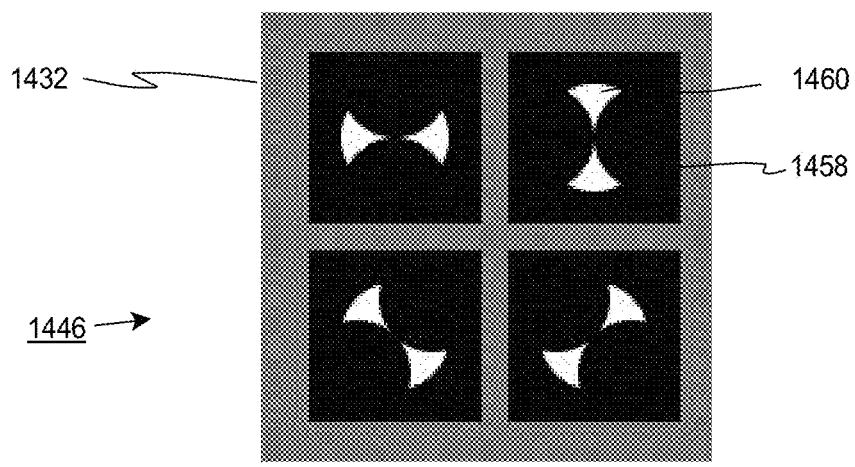
FIG. 14 is a front plan view of still another embodiment of a tile set for a test chart.

FIG. 14 is a front plan view of another embodiment of a tile set 1446 that includes four different chart tiles 1432. In this embodiment, the features 1460 are shaped somewhat similar to a bow tie, and are white on a black background 1458.

Figure 15:
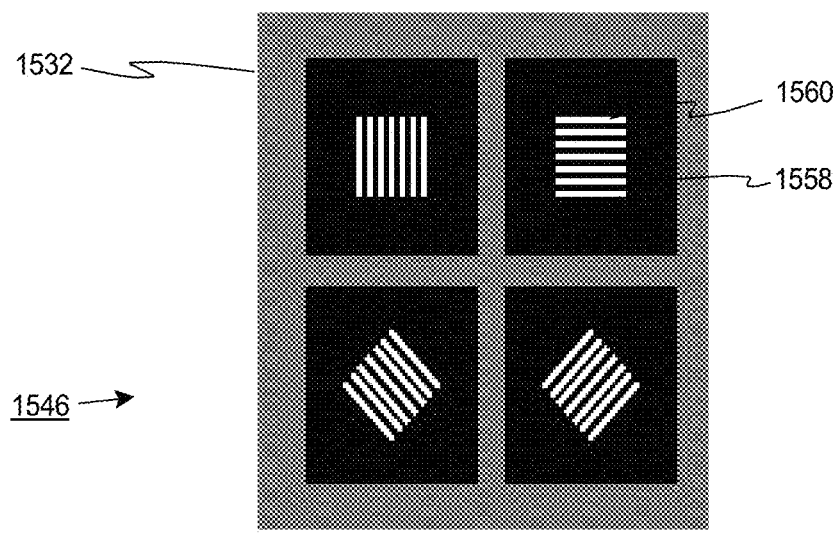
FIG. 15 is a front plan view of another embodiment of a tile set for a test chart.

FIG. 15 is a front plan view of another embodiment of a tile set 1546 that includes four different chart tiles 1532. In this embodiment, the features 1560 are spaced apart white lines on a black background 1558.

Figure 16:
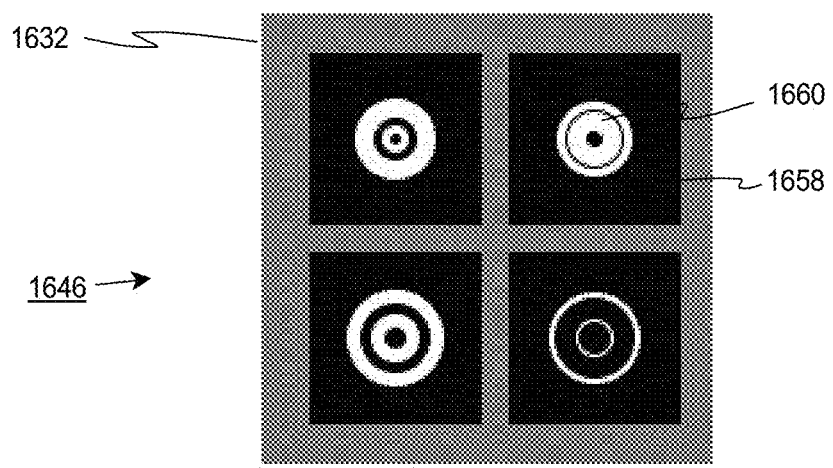
FIG. 16 is a front plan view of yet another embodiment of a tile set for a test chart.

FIG. 16 is a front plan view of another embodiment of a tile set 1646 that includes four different chart tiles 1632. In this embodiment, the features 1660 are spaced apart, concentric white rings on a black background 1658.

Figure 17:
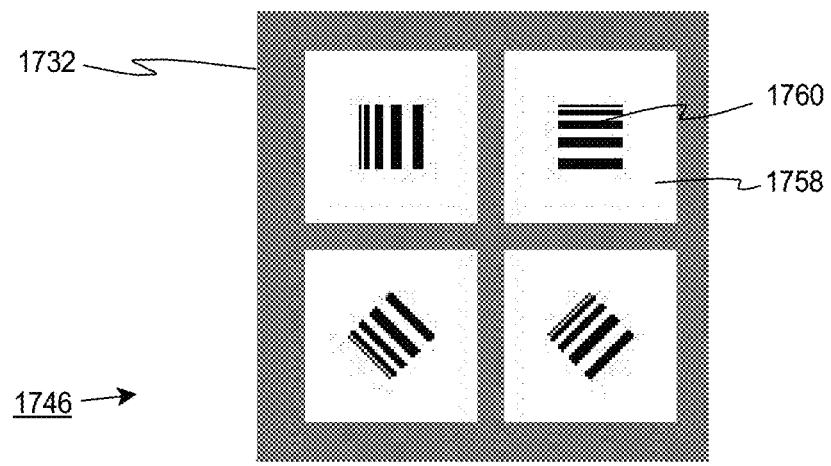
FIG. 17 is a front plan view of still another embodiment of a tile set for a test chart.

FIG. 17 is a front plan view of another embodiment of a tile set 1746 that includes four different chart tiles 1732. In this embodiment, the features 1760 are spaced apart black lines on a white background 1758.

Figure 18:
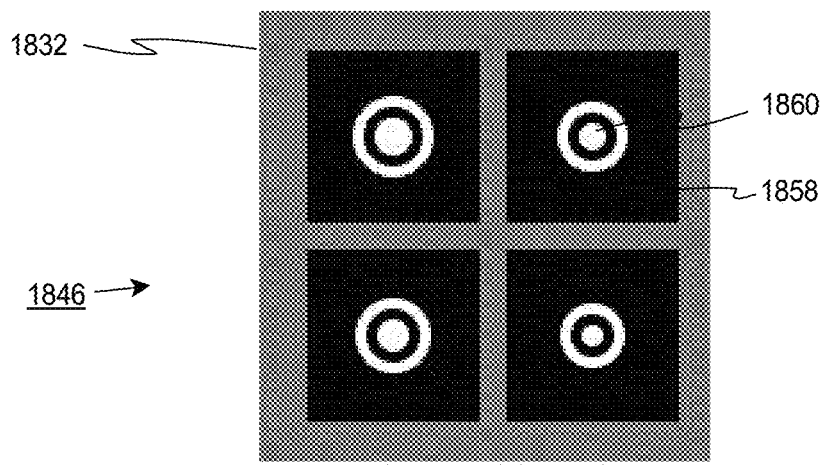
FIG. 18 is a front plan view of another embodiment of a tile set for a test chart.

FIG. 18 is a front plan view of another embodiment of a tile set 1846 that includes four different chart tiles 1832. In this embodiment, the features 1860 are spaced apart, concentric white rings on a black background 1858.

Figure 19:
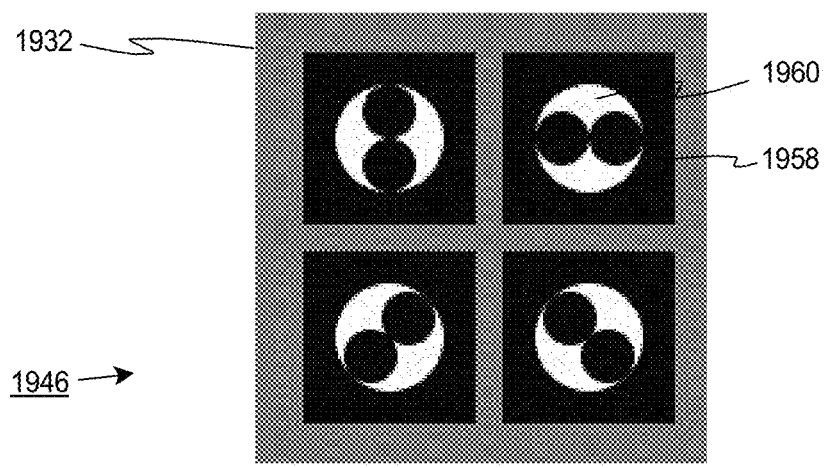
FIG. 19 is a front plan view of another embodiment of a tile set for a test chart.

FIG. 19 is a front plan view of another embodiment of a tile set 1946 that includes four different chart tiles 1932. In this embodiment, the features 1960 are somewhat arched shaped white areas on a black background 1958.

Figure 20:
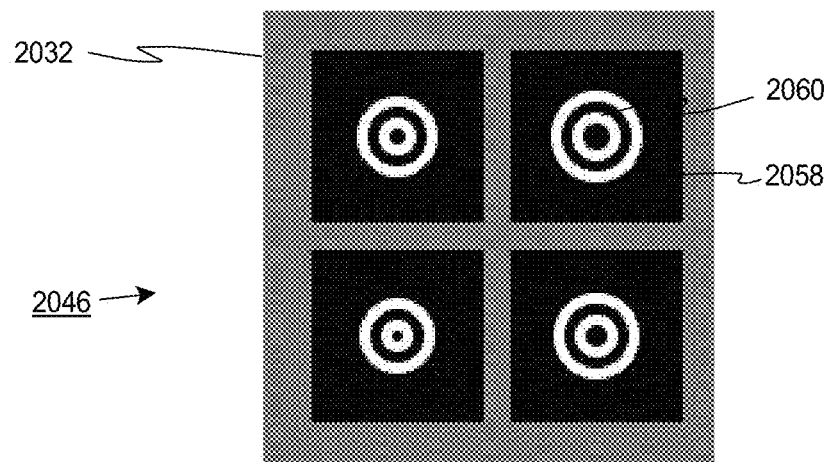
FIG. 20 is a front plan view of another embodiment of a tile set for a test chart.

FIG. 20 is a front plan view of another embodiment of a tile set 2046 that includes four different chart tiles 2032. In this embodiment, the features 2060 are spaced apart, concentric white circles on a black background 2058.

Figure 21:
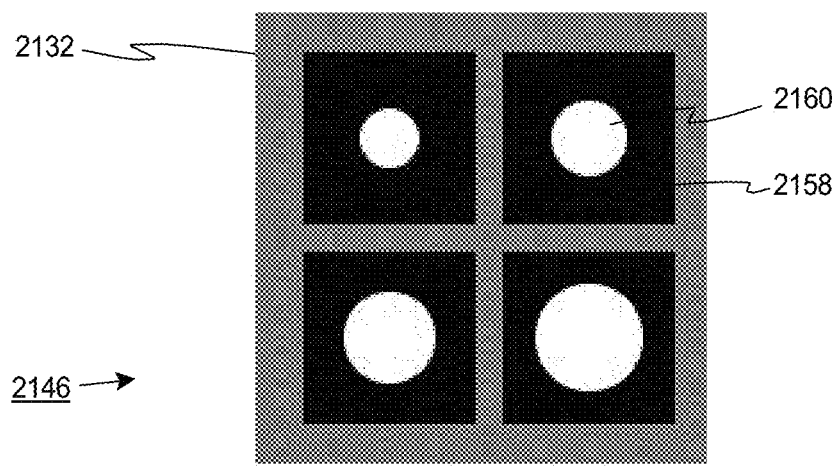
FIG. 21 is a front plan view of another embodiment of a tile set for a test chart.

FIG. 21 is a front plan view of another embodiment of a tile set 2146 that includes four different chart tiles 2132. In this embodiment, the features 2160 are a white circle on a black background 2158.

Figure 22:
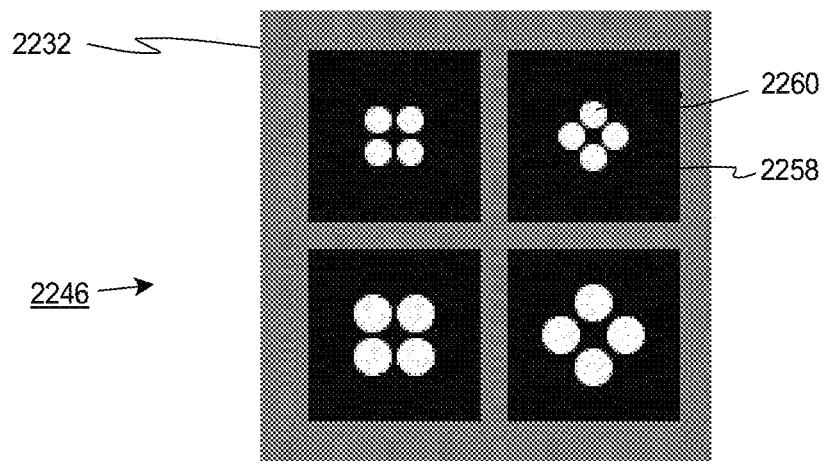
FIG. 22 is a front plan view of yet another embodiment of a tile set for a test chart.

FIG. 22 is a front plan view of another embodiment of a tile set 2246 that includes four different chart tiles 2232. In this embodiment, the features 2260 are spaced apart white circles on a black background 2258.

Figure 23:
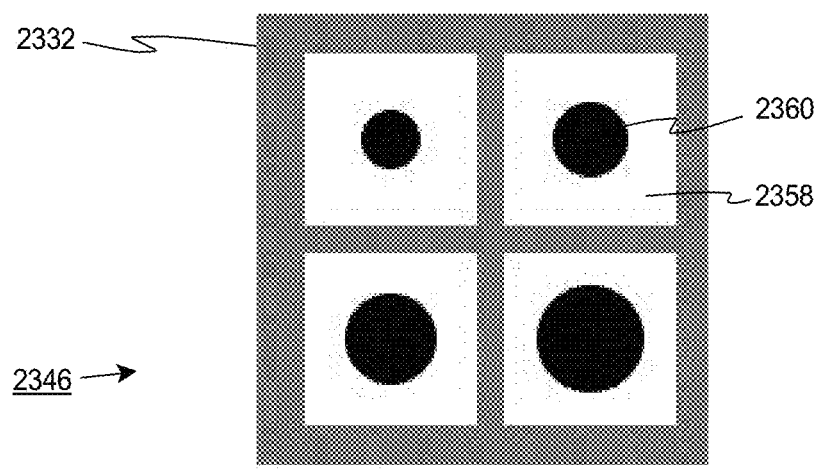
FIG. 23 is a front plan view of still another embodiment of a tile set for a test chart.

FIG. 23 is a front plan view of another embodiment of a tile set 2346 that includes four different chart tiles 2332. In this embodiment, the features 2360 are a black circle on a white background 2358.

Figure 24:
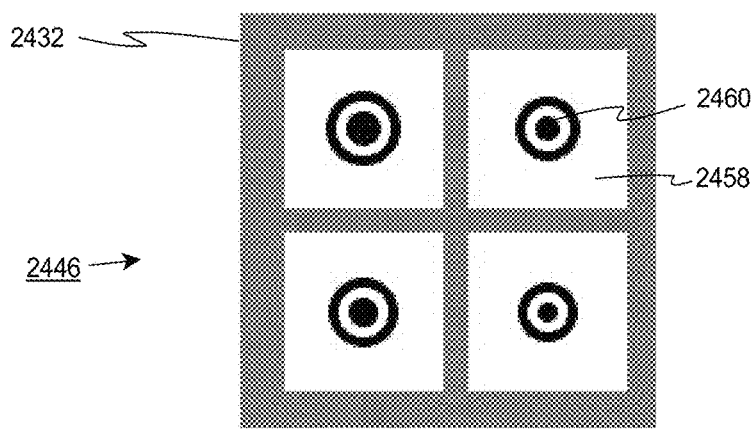
FIG. 24 is a front plan view of another embodiment of a tile set for a test chart.

FIG. 24 is a front plan view of another embodiment of a tile set 2446 that includes four different chart tiles 2432. In this embodiment, the features 2460 are a concentric black circle and ring on a white background 2458.

It should be noted that the test chart can be designed to include one or more of the different tile sets illustrated in FIGS. 2B, 6-24, or even different tile sets.

Figure 25:
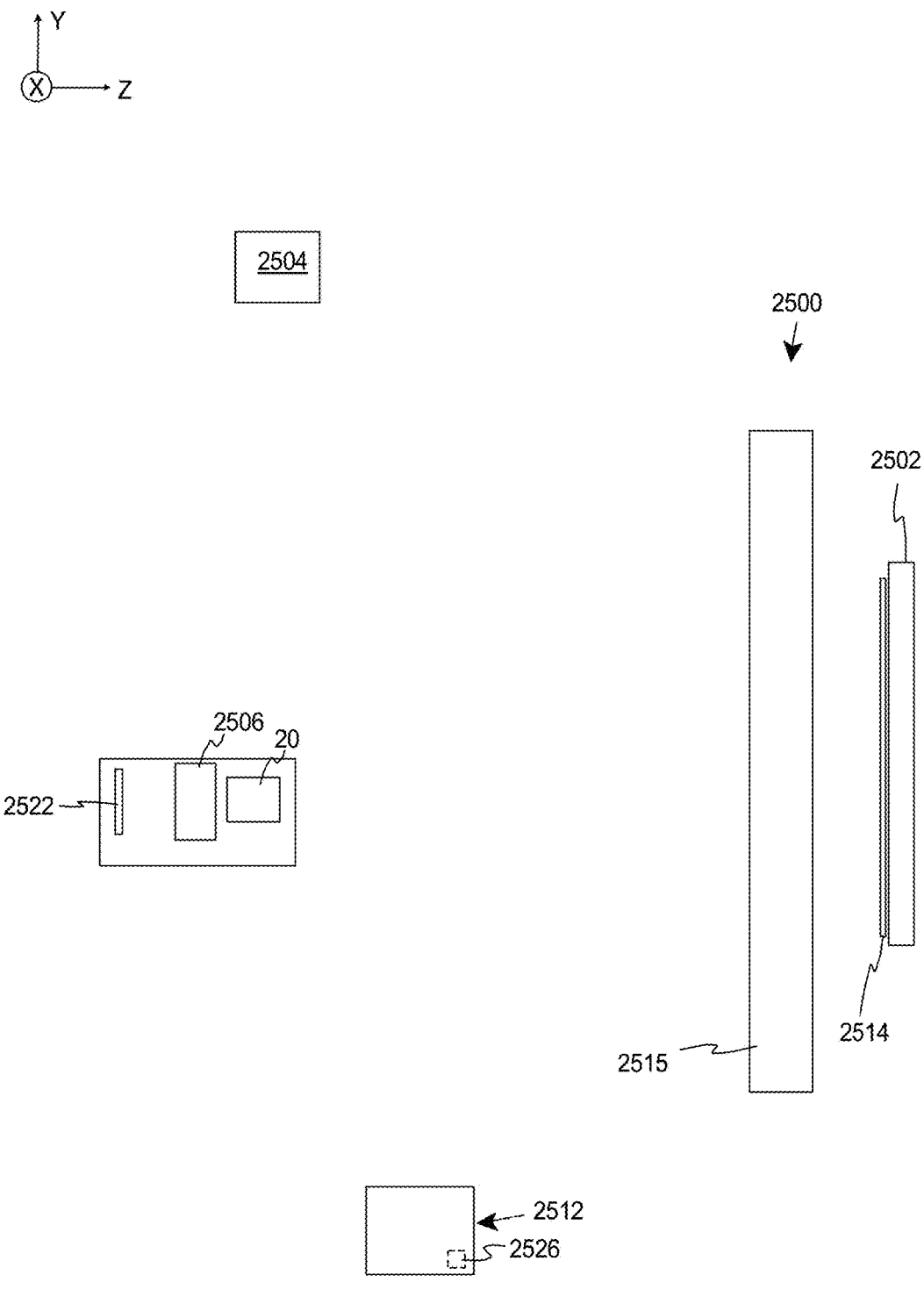
FIG. 25 is a simplified illustration of a test assembly for testing the lens assembly.

FIG. 25 is a simplified illustration of a testing assembly 2500 for evaluating and testing the lens assembly 20. In this embodiment, the testing assembly 2500 will allow for the testing of the lens assembly 20 at a plurality of alternative focus distances. With this design, a separate set of arrays 2600 (illustrated in FIG. 26), 2700 (illustrated in FIG. 27), 2800 (illustrated in FIG. 28) of area optics point spread functions can be generated for each alternative focus distance.

In this embodiment, the testing assembly 2500 includes an image generator 2502 that generates a virtual test chart 2514 (illustrated as a box) and creates the test chart.

As non-exclusive examples, the image generator 2502 can include a slide of the test chart with a light source behind it, or a LCD screen that generates the test chart 2514.

Additionally, the testing assembly 2500 can include a generator optical assembly 2515 that can include some optical elements, collimators and relay lenses that are controlled to selectively change the angles of light rays coming from the image generator 2502. With this design, the generator optical assembly 2515 can be selectively controlled to make the image of the test chart 2514 to appear as if it is at any selected, different focus distance (including infinity) and also making it look the right size. With this design, it is possible to create a virtual test chart at any focus distance from the lens assembly 20 being tested (making it possible to measure PSFs for different focus distances, including infinity).

With this design, for example, the testing assembly 2500 can be controlled so that the virtual test chart has a number of alternative focus distances from the capturing system 2522. With this design, a separate test chart image can be sequentially captured for each desired, different focus distances, and separate red, green and blue channel arrays can be estimated for each of the different focus distances.

In this embodiment, the capturing system 2522 can be a regular camera or some other type of special sensor.

Additionally, the one or more of the various components of the testing assembly 2500 can be mounted on a separate moving/rotating stage and these stages can be selectively controlled to (i) align the lens assembly 20, capturing system 2522, and image properly and position the lens assembly 20 and capturing system 2522 the right distance from the image, and (ii) measure PSFs for different field positions by moving the capturing system 2522 with respect to the image.

In certain embodiments, it may be difficult to have a big test chart covering the entire image. Instead, there might be only a small test chart with a few tiles, allowing to estimate PSFs for one field position at a time or a small number of them.

Additionally, the assembly 2500 can include (i) one or more special light sources 2504 (illustrated as a box) that generate light at one or more different specific wavelengths that would allow estimating PSFs for these certain wavelengths, and/or (ii) a special sensor 2522. With this design, the assembly 2500 would allow measuring PSFs for different single wavelengths. The advantage of that is that, by combining these measured single wavelength PSFs it is possible to generate R, G, and B optics blur PSFs for different camera bodies.

Further, the control system 2526 of the computer 2512 is also illustrated in FIG. 25. In this embodiment, the control system 2526 can analyze the date and generate the relevant arrays of area optics point spread functions.

Furthermore, the assembly 2500 can include an additional lens assembly 2506 (illustrated as a box) on the image capture side (other than the lens assembly 20 being tested), for example for enlarging the image before it is captured by a sensor 2522.

Figure 26:
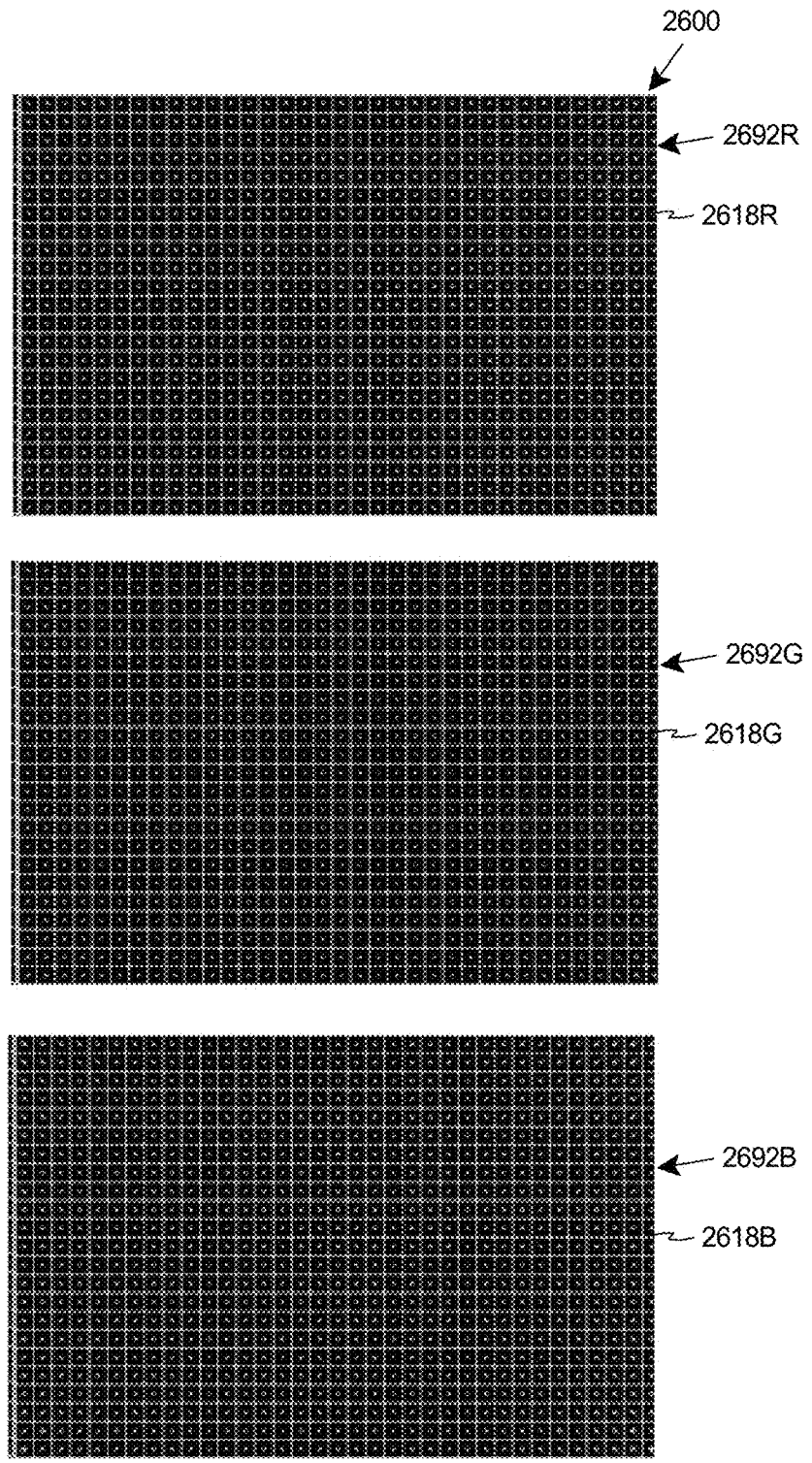
FIG. 26 is a simplified illustration of a first set of arrays of optics point spread functions.

FIG. 26 is a simplified illustration of a first set 2600 of arrays that includes (i) a red array 2692R of red area optics point spread functions 2618R; (ii) a green array 2692G of green area optics point spread functions 2618G; and (iii) a blue array 2692B of blue area optics point spread functions 2618B that were estimated for a first focal distance.

Figure 27:
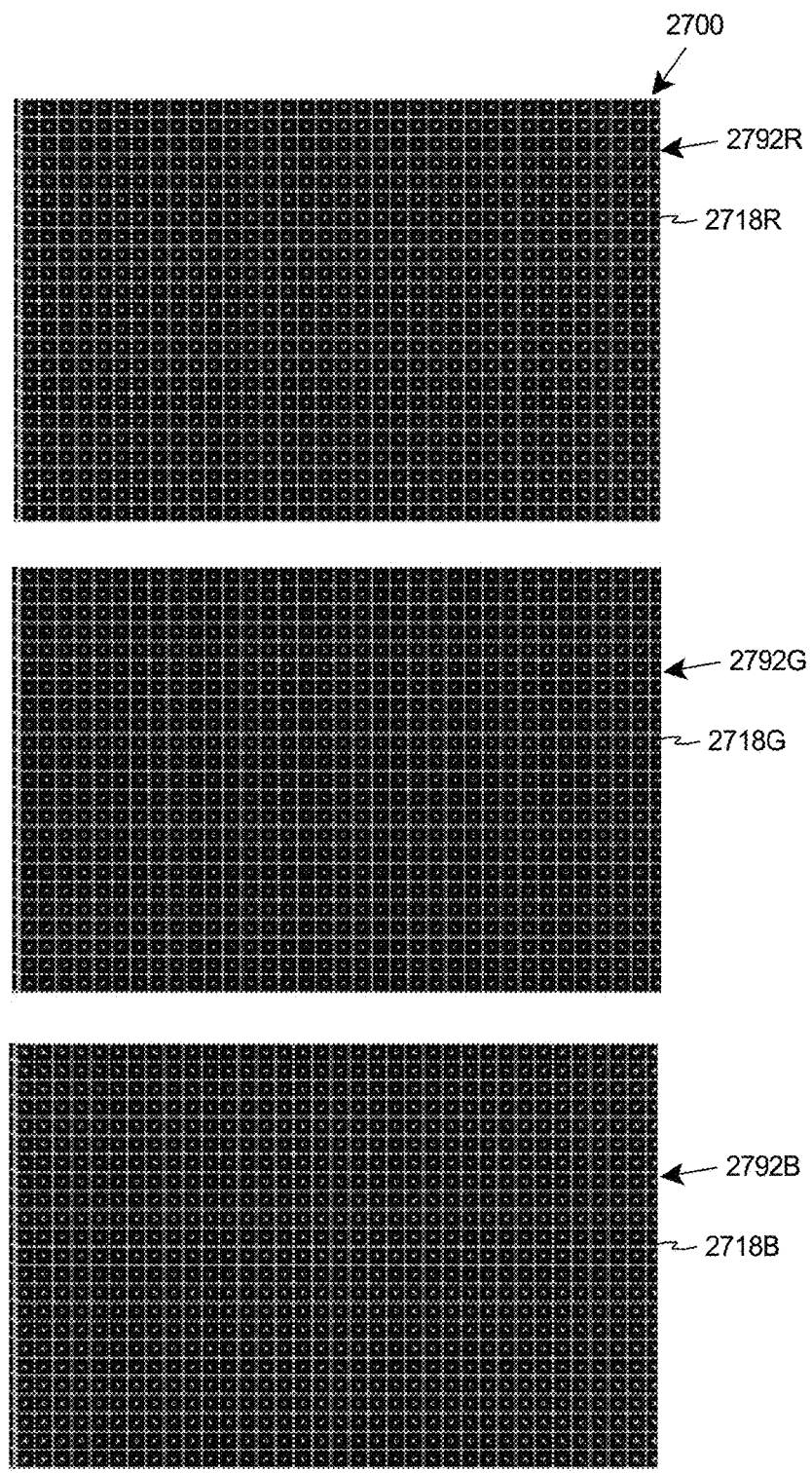
FIG. 27 is a simplified illustration of a second set of arrays of optics point spread functions.

Somewhat similarly, FIG. 27 is a simplified illustration of a second set 2700 of arrays that includes (i) a red array 2792R of red area optics point spread functions 2718R; (ii) a green array 2792G of green area optics point spread functions 2718G; and (iii) a blue array 2792B of blue area optics point spread functions 2718B that were estimated for a second focal distance that is different from the first focal distance.

Figure 28:
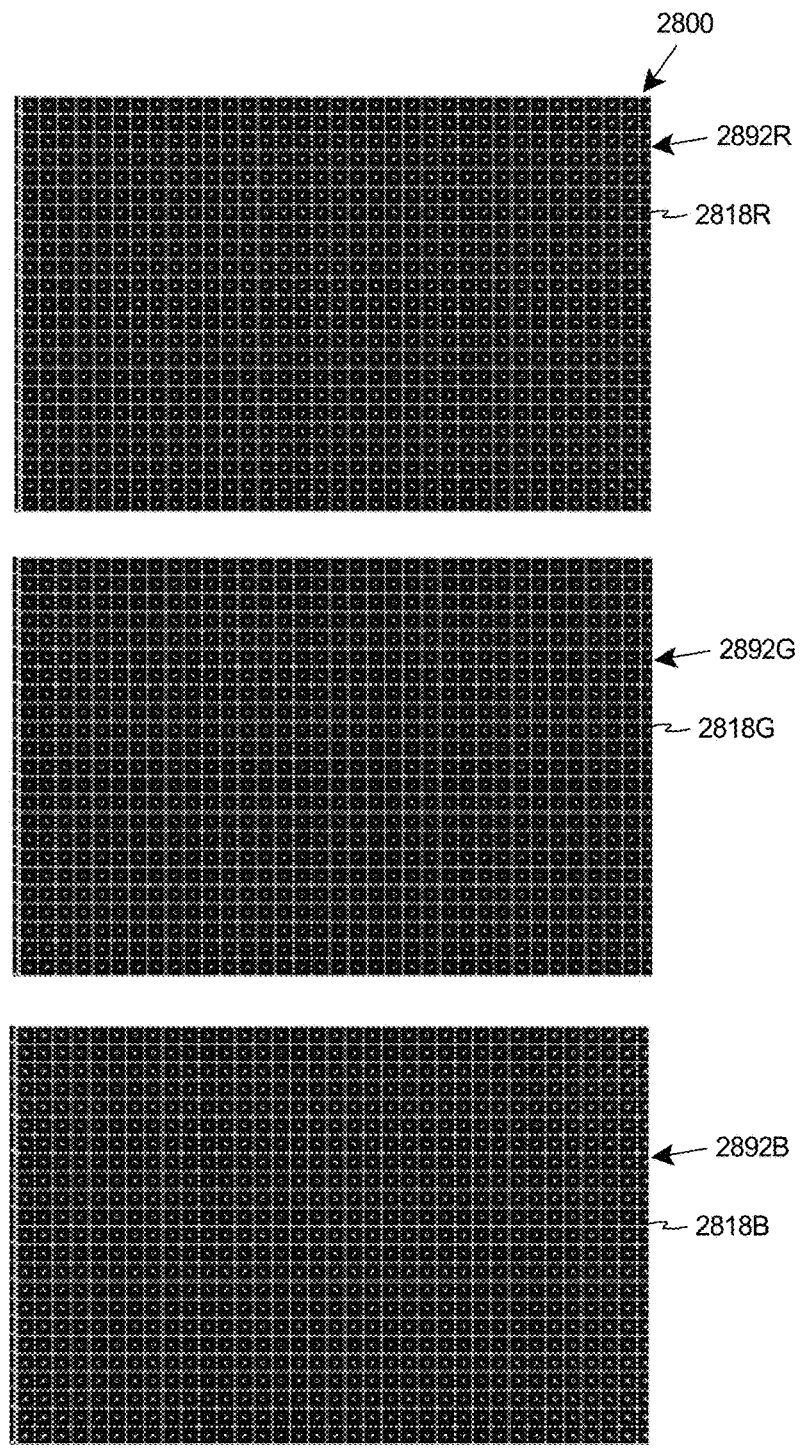
FIG. 28 is a simplified illustration of a third set of arrays of optics point spread functions.

Further, FIG. 28 is a simplified illustration of a second set 2800 of arrays that includes (i) a red array 2892R of red area optics point spread functions 2818R; (ii) a green array 2892G of green area optics point spread functions 2818G; and (iii) a blue array 2892B of blue area optics point spread functions 2818B that were estimated for a third focal distance that is different from the first and second focal distances.

While the current invention is disclosed in detail herein, it is to be understood that it is merely illustrative of the presently preferred embodiments of the invention and that no limitations are intended to the details of construction or design herein shown other than as described in the appended claims.

What is claimed is:
1. A method for estimating a plurality of spaced apart, optics point spread functions of a lens assembly for use in processing an image, the method comprising:
providing a test chart having a test chart pattern, wherein the test chart pattern is used to provide a latent sharp image;
positioning a capturing system in a fixed position relative to the test chart;
capturing a test chart image of the test chart with the capturing system using the lens assembly to focus light onto the capturing system;
dividing the test chart image into a plurality of image areas, including a first image area and a second image area that is different from the first image area with a control system that includes a processor;

dividing the first image area into a plurality of first area blocks with the control system, each first area block including a plurality of pixels;

estimating a first area optics point spread function of the first image area with the control system by minimizing a first, non-blind, PSF cost function that sums fidelity terms of at least two of the first area blocks and uses a portion of the latent sharp image in the fidelity terms to estimate the first area optics point spread function using a spatially invariant convolution model for the first image area;

dividing the second image area into a plurality of second area blocks with the control system, each second area block including a plurality of pixels;

estimating a second area optics point spread function of the second image area with the control system by minimizing a second, non-blind, PSF cost function that sums fidelity terms of at least two of the second area blocks and uses a portion of the latent sharp image in the fidelity terms to estimate the second area optics point spread function using a spatially invariant convolution model for the second image area;

capturing a subsequent image; and processing the subsequent image using at least one of the first area optics point spread function and the second area optics point spread function.

2. The method of claim 1 wherein the step of dividing the first image area includes the first area blocks being spaced apart and adjacent to each other; and wherein the step of dividing the second image area includes the second area blocks being spaced apart and adjacent to each other.

3. The method of claim 1 wherein the plurality of image areas includes a third image area that is different from the first image area and the second image area;

and further comprising the steps of (i) dividing the third image area into a plurality of third area blocks with the control system, each third area block including a plurality of pixels;

and (ii) estimating a third area optics point spread function of the third image area with the control system that minimizes a third, non-blind, PSF cost function that sums fidelity terms of at least two of the third area blocks and uses a portion of the latent sharp image in the fidelity terms to estimate the third area optics point spread function using a spatially invariant convolution model for the third image area.

4. The method of claim 1 wherein the step of providing a test chart includes the test chart pattern having a plurality of square chart tiles that are spaced apart from one another, the chart tiles including a first chart tile having a first tile pattern and a second chart tile having a second tile pattern that is different from the first tile pattern.

5. The method of claim 4 wherein the step of providing a test chart includes the first chart tile and the second chart tile being periodically repeated in the test chart pattern.

6. The method of claim 4 wherein the step of providing a test chart includes each chart tile having a black background and white features.

7. The method of claim 4 wherein the test chart image includes a plurality of tile images as a result of the chart tiles in the test chart, and further comprising the step of segmenting out each individual tile image with the control system.

8. The method of claim 7 wherein the step of providing a test chart includes the test chart pattern having a plurality of horizontal dividers and a plurality of vertical dividers that cooperate to form the plurality of spaced apart chart tiles; and wherein the step of segmenting includes using the dividers to segment each individual tile image and estimate a tile image center of each tile image.

9. The method of claim 4 wherein the step of dividing the first image area into a plurality of first area blocks with the control system includes each first area block including a separate tile image; and wherein the step of dividing the second image area into a plurality of second area blocks with the control system includes each second area block including a separate tile image.

10. The method of claim 9 further comprising the step of artificially distorting at least a portion of the test chart pattern to match geometric distortion of the tile images to provide the latent sharp image prior to the steps of estimating a first area optics point spread function and estimating a second area optics point spread function.

11. The method of claim 1 wherein the step of providing a test chart includes the test chart pattern having a plurality of horizontal dividers and a plurality of vertical dividers that cooperate to form a plurality of spaced apart chart tiles, each divider forming a physical barrier between adjacent chart tiles.

12. The method of claim 11 wherein the step of providing a test chart includes the chart tiles having a square shape.

13. The method of claim 1 wherein the dividing the first image area into a plurality of first area blocks with the control system includes each first area block being the same size; and wherein the dividing the second image area into a plurality of second area blocks with the control system includes each second area block being the same size.

14. The method of claim 1 wherein each PSF cost function is a regularized least squares cost function that includes a regularization term.

15. The method of claim 1 wherein the step of estimating a first area optics point spread function includes the first, non-blind PSF cost function having the form as follows:

$$c(K) = \omega_0 \sum_{j=1}^{J} \|L_j * K - B_j\|_p^p +$$

$$\omega_1 \sum_{j=1}^{J} \|D_x * L_j * K - D_x * B_j\|_p^p + \omega_2 \sum_{j=1}^{J} \|D_y * L_j * K - D_y * B_j\|_p^p +$$

$$\omega_{11} \sum_{j=1}^{J} \|D_{xx} * L_j * K - D_{xx} * B_j\|_p^p + \omega_{12} \sum_{j=1}^{J} \|D_{xy} * L_j * K - D_{xy} * B_j\|_p^p +$$

$$\omega_{22} \sum_{j=1}^{J} \|D_{yy} * L_j * K - D_{yy} * B_j\|_p^p + RegularizationTerm(s);$$

where (i) c(K) is the PSF cost function, (ii) $L_j$ is the latent sharp image at area block j, (iii) K is the PSF kernel, (iv) $B_j$ is the blurry image at area block j, (v) $D_x$ and $D_y$ are first order partial derivative operators, (vi) $D_{xx}$, $D_{yy}$, and $D_{xy}$ are second order partial derivative operators, (vii) $\omega_0$, $\omega_1$, $\omega_2$, $\omega_{11}$, $\omega_{12}$, and $\omega_{22}$ are fidelity weight parameters for the fidelity terms, (viii) s is a total number of area blocks used estimate the area point spread function of the image area, and (ix) p is a power and a norm for the fidelity term(s).

16. The method of claim 1 wherein the step of providing a test chart includes the step of projecting a virtual test chart.

17. The method of claim 16 wherein the step of projecting includes the steps of projecting a first virtual test chart for estimating a plurality of spaced apart, optics point spread functions of the lens assembly at a first focal distance; and projecting a second virtual test chart for estimating a plurality of spaced apart, optics point spread functions of the lens assembly at a second focal distance.

18. A system for estimating a plurality of spaced apart, optics point spread functions of a lens assembly, the system comprising:
a test chart having a test chart pattern, wherein the test chart pattern is used to provide a latent sharp image;
a capturing system that is positioned in a fixed position relative to the test chart, the capturing system capturing a test chart image of the test chart using the lens assembly to focus light onto the capturing system; and
a control system that includes a processor, the control system being configured to perform the steps of:
dividing the test chart image into a plurality of image areas, including a first image area and a second image area that is different from the first image area;
dividing the first image area into a plurality of first area blocks with the control system, each first area bock including a plurality of pixels;
estimating a first area optics point spread function of the first image area with the control system by minimizing a first, non-blind, PSF cost function that sums fidelity terms of at least two of the first area blocks and uses a portion of the latent sharp image in the fidelity terms to estimate the first area optics point spread function using a spatially invariant convolution model for the first image area;
dividing the second image area into a plurality of second area blocks with the control system, each second area block including a plurality of pixels;
estimating a second area optics point spread function of the second image area with the control system by minimizing a second, non-blind, PSF cost function that sums fidelity terms of at least two of the second area blocks and uses a portion of the latent sharp image in the fidelity terms to estimate the second area optics point spread function using a spatially invariant convolution model for the second image area;
capturing a subsequent image; and
processing the subsequent image using at least one of the first area optics point spread function and the second area optics point spread function.

19. The system of claim 18 wherein the test chart includes the test chart pattern having a plurality of square chart tiles that are spaced apart from one another, the chart tiles including a first chart tile having a first tile pattern and a second chart tile having a second tile pattern that is different from the first tile pattern.

20. The system of claim 18 wherein the test chart includes the test chart pattern having a plurality of horizontal dividers and a plurality of vertical dividers that cooperate to form a plurality of spaced apart chart tiles, each divider forming a physical barrier between adjacent chart tiles.

21. A method for evaluating a lens assembly, the method comprising:
providing a test chart having a the set including a plurality of chart tiles that are spaced apart from one another with a divider positioned between adjacent chart tiles of the set, the divider forming a physical barrier between the adjacent chart tiles of the set;
positioning a capturing system in a fixed position relative to the test chart; capturing a test chart image of the test chart with the capturing system using the lens assembly to focus light onto the capturing system;
dividing the test chart image into a plurality of image areas, including a first image area and a second image area that is different from the first image area with a control system that includes a processor;
dividing the first image area into a plurality of first area blocks with the control system, each first area block including a plurality of pixels;
estimating a first area optics point spread function of the first image area with the control system using at least some of the plurality of pixels in a PSF cost function that sums fidelity terms of at least two of the first area blocks to estimate the first area optics point spread function;
capturing a subsequent image; and
processing the subsequent image using at least one of the first area optics point spread function and the second area optics point spread function.

22. The method of claim 21 further comprising (i) dividing the second image area into a plurality of second area blocks with the control system, each second area block including a plurality of pixels; and (ii) estimating a second area optics point spread function of the second image area with the control system using at least some of the plurality of pixels in a PSF cost function that sums fidelity terms of at least two of the second area blocks to estimate the second area optics point spread function.

\* \* \* \* \*

UNITED STATES PATENT AND TRADEMARK OFFICE
CERTIFICATE OF CORRECTION

PATENT NO. : 10,165,263 B2
APPLICATION NO. : 14/948165
DATED : December 25, 2018
INVENTOR(S) : Radka Tezaur Page 1 of 1

It is certified that error appears in the above-identified patent and that said Letters Patent is hereby corrected as shown below:

In the Claims

Column 29, Line 23, Claim 18 replace "bock" with --block--

Column 30, Line 12, Claim 21 replace "a the set" with --a tile set--

Column 30, Line 15, Claim 21 replace "the set" with --the tile set--

Column 30, Line 16, Claim 21 replace "the set" with --the tile set--

Signed and Sealed this
Second Day of April, 2019

Andrei Iancu
*Director of the United States Patent and Trademark Office*